United States Patent
Liu et al.

(10) Patent No.: US 11,792,824 B2
(45) Date of Patent: Oct. 17, 2023

(54) MULTICAST FEEDBACK AND RETRANSMISSION FOR TRANSPORT BLOCK GROUPING

(71) Applicant: QUALCOMM incorporated, San Diego, CA (US)

(72) Inventors: Le Liu, Fremont, CA (US); Alberto Rico Alvarino, San Diego, CA (US); Peter Gaal, San Diego, CA (US); Kazuki Takeda, Tokyo (JP); Ayan Sengupta, San Diego, CA (US); Wanshi Chen, San Diego, CA (US); Xiaoxia Zhang, San Diego, CA (US); Juan Montojo, San Diego, CA (US); Tao Luo, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/214,519

(22) Filed: Mar. 26, 2021

(65) Prior Publication Data

US 2021/0306981 A1    Sep. 30, 2021

Related U.S. Application Data

(60) Provisional application No. 63/001,804, filed on Mar. 30, 2020.

(51) Int. Cl.
*H04W 72/30* (2023.01)
*H04W 72/044* (2023.01)
(Continued)

(52) U.S. Cl.
CPC .......... *H04W 72/30* (2023.01); *H04L 1/1896* (2013.01); *H04W 24/08* (2013.01); *H04W 72/0466* (2013.01)

(58) Field of Classification Search
CPC ... H04L 1/0009; H04L 1/0057; H04L 1/1614; H04L 1/1635; H04L 1/1819;
(Continued)

(56) References Cited

U.S. PATENT DOCUMENTS 7,043,244 B1 * 5/2006 Fauconnier .......... H04W 36/18
                                                        455/442
9,729,274 B2 * 8/2017 Koslov ................. H04L 1/0065
(Continued)

OTHER PUBLICATIONS

Partial International Search Report—PCT/US2021/024651—ISA/EPO—dated Jun. 23, 2021.
(Continued)

*Primary Examiner* — Dung B Huynh
(74) *Attorney, Agent, or Firm* — Holland & Hart / Qualcomm

(57) ABSTRACT

Methods, systems, and devices for wireless communication are described. Generally, the described techniques provide for efficiently allocating resources for multicast feedback from one or more user equipment (UEs) and efficiently retransmitting information in transport blocks to the one or more UEs. If a UE fails to decode one or more transport blocks of a set of transport blocks from a base station, the UE may report feedback, such as a negative acknowledgment (NACK), to the base station. The base station may receive the feedback from the UE and potentially from other UEs that failed to decode one or more transport blocks of the set of transport blocks, and the base station may multicast one or more outer-coded transport blocks to the UEs. Each of the outer-coded transport blocks may include a different combination (for example, a linear combination) of transport blocks of the set of transport blocks.

30 Claims, 15 Drawing Sheets

(51) Int. Cl.
*H04W 24/08* (2009.01)
*H04L 1/1867* (2023.01)

(58) Field of Classification Search
CPC ......... H04L 1/1896; H04L 2001/0093; H04L 5/0055; H04L 5/0094; H04W 24/08; H04W 72/005; H04W 72/0466
See application file for complete search history.

(56) References Cited

U.S. PATENT DOCUMENTS

| | | | | |
|---|---|---|---|---|
| 9,781,566 | B1* | 10/2017 | Rison | H04W 4/023 |
| 10,177,791 | B1* | 1/2019 | Sridhara | H03M 13/2909 |
| 10,721,030 | B2* | 7/2020 | Seo | H04W 72/23 |
| 11,490,409 | B2* | 11/2022 | Su | H04W 72/21 |
| 2003/0031198 | A1* | 2/2003 | Currivan | H03M 13/2707 370/465 |
| 2006/0013168 | A1* | 1/2006 | Agrawal | H04B 7/2656 370/335 |
| 2006/0224760 | A1* | 10/2006 | Yu | H04L 67/108 709/231 |
| 2006/0291410 | A1* | 12/2006 | Herrmann | H04W 52/48 370/328 |
| 2007/0178916 | A1* | 8/2007 | Sorbara | H04L 1/0065 455/458 |
| 2009/0304292 | A1* | 12/2009 | Chen | H04N 19/176 382/233 |
| 2010/0056197 | A1* | 3/2010 | Attar | H04W 52/241 455/522 |
| 2010/0246516 | A1* | 9/2010 | Pelletier | H04W 74/004 370/329 |
| 2012/0013558 | A1* | 1/2012 | Lin | G06F 3/044 345/173 |
| 2012/0177011 | A1* | 7/2012 | Xi | H04B 7/0456 370/335 |
| 2012/0188899 | A1* | 7/2012 | Zhang | H04L 25/03898 370/252 |
| 2013/0170463 | A1* | 7/2013 | Yang | H04W 74/006 370/329 |
| 2013/0176920 | A1* | 7/2013 | Seo | H04W 72/04 370/280 |
| 2013/0208692 | A1* | 8/2013 | Seo | H04L 1/1854 370/329 |
| 2014/0078974 | A1* | 3/2014 | Falahati | H04W 52/146 370/329 |
| 2014/0112294 | A1* | 4/2014 | Graumann | H04L 1/1812 370/329 |
| 2014/0229800 | A1* | 8/2014 | Eroz | H03M 13/1165 714/776 |
| 2014/0321418 | A1* | 10/2014 | Rinne | H04L 1/1854 370/329 |
| 2015/0039962 | A1* | 2/2015 | Fonseka | H03M 13/3746 714/755 |
| 2015/0208278 | A1* | 7/2015 | Oizumi | H04W 28/04 370/216 |
| 2016/0212425 | A1* | 7/2016 | Zhu | H04N 19/12 |
| 2016/0218849 | A1* | 7/2016 | Bertrand | H04L 1/1621 |
| 2016/0218883 | A1* | 7/2016 | Lee | H04L 65/612 |
| 2016/0352419 | A1* | 12/2016 | Fonseka | H04L 1/0052 |
| 2017/0150387 | A1* | 5/2017 | Fujishiro | H04W 16/14 |
| 2017/0265193 | A1* | 9/2017 | Wang | H04W 4/70 |
| 2017/0339701 | A1* | 11/2017 | Choi | H04L 5/0037 |
| 2018/0062669 | A1* | 3/2018 | Wu | H03M 13/613 |
| 2018/0145703 | A1* | 5/2018 | Li | H04L 1/0045 |
| 2018/0145797 | A1* | 5/2018 | Yeo | H04L 1/1812 |
| 2018/0159660 | A1* | 6/2018 | Jia | H04L 1/0041 |
| 2018/0176940 | A1* | 6/2018 | Xu | H04W 72/12 |
| 2018/0212627 | A1* | 7/2018 | Hosseini | H04L 1/1819 |
| 2018/0234880 | A1* | 8/2018 | Jiang | H04L 1/1607 |
| 2018/0269899 | A1* | 9/2018 | Noh | H03M 13/2906 |
| 2018/0287744 | A1* | 10/2018 | Sundararajan | H04L 1/1816 |
| 2018/0337763 | A1* | 11/2018 | Shi | H04W 72/23 |
| 2019/0068318 | A1* | 2/2019 | Marinier | H04L 1/0061 |
| 2019/0097677 | A1* | 3/2019 | Sen | H04W 72/048 |
| 2019/0140784 | A1* | 5/2019 | Xi | H03M 13/2942 |
| 2019/0158827 | A1* | 5/2019 | Sim | H04N 19/52 |
| 2019/0190654 | A1* | 6/2019 | You | H04L 1/0069 |
| 2019/0199477 | A1* | 6/2019 | Park | H04L 1/0693 |
| 2019/0230691 | A1* | 7/2019 | Cao | H04L 5/0042 |
| 2019/0260502 | A1* | 8/2019 | Ma | H04L 1/0042 |
| 2019/0268095 | A1* | 8/2019 | Yeo | H04L 1/1819 |
| 2019/0268854 | A1* | 8/2019 | Suzuki | H04L 27/2636 |
| 2019/0273582 | A1* | 9/2019 | Yeo | H04L 1/1887 |
| 2019/0319749 | A1* | 10/2019 | Cao | H04L 1/189 |
| 2019/0334559 | A1* | 10/2019 | Panteleev | H03M 13/1137 |
| 2020/0059327 | A1* | 2/2020 | Kini | H04L 1/1812 |
| 2020/0059345 | A1* | 2/2020 | Pelletier | H04L 5/0064 |
| 2020/0092047 | A1* | 3/2020 | Yeo | H04L 1/16 |
| 2020/0099499 | A1* | 3/2020 | Yeo | H04W 56/001 |
| 2020/0106566 | A1* | 4/2020 | Yeo | H04W 28/04 |
| 2020/0107015 | A1* | 4/2020 | Seo | H04N 19/172 |
| 2020/0128528 | A1* | 4/2020 | Tang | H04W 72/53 |
| 2020/0163088 | A1* | 5/2020 | Ji | H04L 5/0044 |
| 2020/0178265 | A1* | 6/2020 | Feng | H04L 1/08 |
| 2020/0191939 | A1* | 6/2020 | Wu | G01S 7/354 |
| 2020/0195386 | A1* | 6/2020 | Marinier | H04L 1/0088 |
| 2020/0259600 | A1* | 8/2020 | Cao | H04W 72/1289 |
| 2020/0295787 | A1* | 9/2020 | Meller | H03M 13/3977 |
| 2020/0314817 | A1* | 10/2020 | Sun | H04L 5/0094 |
| 2020/0343909 | A1* | 10/2020 | Chen | H03M 13/13 |
| 2020/0344722 | A1* | 10/2020 | He | H04W 72/0446 |
| 2021/0014647 | A1* | 1/2021 | Takeda | H04W 4/70 |
| 2021/0014829 | A1* | 1/2021 | Kalhan | H04L 1/0003 |
| 2021/0028893 | A1* | 1/2021 | Hwang | H04W 76/28 |
| 2021/0126655 | A1* | 4/2021 | Jia | H04L 1/0066 |
| 2021/0159948 | A1* | 5/2021 | Li | H04L 1/1887 |
| 2021/0168847 | A1* | 6/2021 | Luo | H04L 1/1896 |
| 2021/0218499 | A1* | 7/2021 | Yavas | H04L 1/0643 |
| 2021/0218539 | A1* | 7/2021 | Hu | H04L 5/0094 |
| 2021/0226732 | A1* | 7/2021 | Yeo | H03M 13/6306 |
| 2021/0297180 | A1* | 9/2021 | Ma | H04L 1/0041 |
| 2021/0321414 | A1* | 10/2021 | Yeo | H04W 72/0493 |
| 2021/0360523 | A1* | 11/2021 | Hwang | H04W 52/0216 |
| 2021/0360529 | A1* | 11/2021 | Yang | H04W 52/0232 |
| 2021/0368385 | A1* | 11/2021 | Zhu | H04L 1/1887 |
| 2021/0377912 | A1* | 12/2021 | El Hamss | H04L 1/1854 |
| 2021/0378001 | A1* | 12/2021 | Luo | H04W 72/1289 |
| 2021/0399847 | A1* | 12/2021 | Zhu | H04L 1/1854 |
| 2022/0006573 | A1* | 1/2022 | Beale | H04W 28/04 |
| 2022/0021483 | A1* | 1/2022 | Cao | H04L 1/1819 |
| 2022/0030241 | A1* | 1/2022 | Toma | H04N 19/103 |
| 2022/0070897 | A1* | 3/2022 | Hwang | H04L 1/1854 |
| 2022/0070898 | A1* | 3/2022 | Yeo | H04W 72/1257 |
| 2022/0078708 | A1* | 3/2022 | Yang | H04W 76/28 |
| 2022/0094939 | A1* | 3/2022 | Chuang | H04N 19/136 |
| 2022/0131652 | A1* | 4/2022 | Bae | H04L 5/1469 |
| 2022/0191899 | A1* | 6/2022 | Hwang | H04L 5/0012 |
| 2022/0239443 | A1* | 7/2022 | Liu | H04L 5/0053 |
| 2022/0263603 | A1* | 8/2022 | Papasakellariou | H04L 1/0004 |
| 2022/0272732 | A1* | 8/2022 | Sun | H04W 72/23 |
| 2022/0287069 | A1* | 9/2022 | Sengupta | H04L 1/1607 |
| 2022/0360363 | A1* | 11/2022 | Lin | H04L 1/0016 |
| 2022/0361212 | A1* | 11/2022 | Mu | H04W 72/23 |
| 2022/0368402 | A1* | 11/2022 | Raghavan | H04B 7/0617 |
| 2023/0107562 | A1* | 4/2023 | Wang | H04W 72/21 370/329 |
| 2023/0163984 | A1* | 5/2023 | Shan | H04M 15/66 370/259 |

OTHER PUBLICATIONS

International Search Report and Written Opinion—PCT/US2021/024651—ISA/EPO—dated Aug. 27, 2021.

* cited by examiner

| Base station | Transport Block 1 | Transport Block 2 | Transport Block 3 |
|---|---|---|---|
| UE 1 | OK | X | OK |
| UE 2 | X | OK | OK |
| UE 3 | OK | OK | X |
| | NACK for TB1 → Retransmit TB1 | NACK for TB2 → Retransmit TB2 | NACK for TB3 → Retransmit TB3 |

MULTICAST FEEDBACK AND RETRANSMISSION FOR TRANSPORT BLOCK GROUPING

CROSS REFERENCE

The present application for patent claims the benefit of U.S. Provisional Patent Application No. 63/001,804 by LIU et al., entitled "MULTICAST FEEDBACK AND RETRANSMISSION FOR TRANSPORT BLOCK GROUPING," filed Mar. 30, 2020, assigned to the assignee hereof, and expressly incorporated by reference herein.

TECHNICAL FIELD

The following relates generally to wireless communications and more specifically to multicast feedback and retransmission for transport block grouping.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a quantity of base stations or network access nodes, each simultaneously supporting communication for multiple communication devices, which may be otherwise known as user equipments (UEs). In some wireless communications systems, a base station may broadcast or multicast data to one or more UEs and the one or more UEs may monitor for the data from the base station. If a UE fails to decode the data, the UE may report feedback to the base station to trigger a retransmission of the data from the base station.

SUMMARY

The described techniques relate to improved methods, systems, devices, and apparatuses that support multicast feedback and retransmission for transport block grouping. Generally, the described techniques provide for efficiently allocating resources for multicast feedback from one or more user equipments (UEs) to a base station and efficiently retransmitting information in transport blocks from the base station to the one or more of the UEs. If a UE fails to decode one or more transport blocks of a set of transport blocks transmitted from the base station, the UE (or multiple UEs) may report feedback, such as a negative acknowledgment (NACK), to the base station. The base station may receive the feedback, such as the NACK, from the UE and potentially from other UEs that also failed to decode one or more transport blocks of the set of transport blocks. The base station may then multicast one or more outer-coded transport blocks to the UEs that failed to decode the one or more transport blocks of the set of transport blocks. Each of the outer-coded transport blocks may include a different combination (for example, a linear combination) of transport blocks of the set of transport blocks. A UE may use the outer-coded transport blocks, which may include the different combination of transport blocks, and one or more successfully decoded transport blocks of the set of transport blocks to decode the information from the one or more transport blocks that the UE originally failed to decode.

A method of wireless communication at a UE is described. The method may include monitoring for a set of transport blocks from a base station, failing to decode one or more transport blocks of the set of transport blocks, transmitting one or more negative acknowledgments to the base station indicating that the UE failed to decode the one or more transport blocks, and receiving one or more outer-coded transport blocks each including one or more combinations of transport blocks of the set of transport blocks based on transmitting the one or more negative acknowledgments.

Another innovative aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to monitor for a set of transport blocks from a base station, fail to decode one or more transport blocks of the set of transport blocks, transmit one or more negative acknowledgments to the base station indicating that the UE failed to decode the one or more transport blocks, and receive one or more outer-coded transport blocks each including one or more combinations of transport blocks of the set of transport blocks based on transmitting the one or more negative acknowledgments.

Another innovative aspect of the subject matter described in this disclosure can be implemented in an apparatus for wireless communication at a UE. The apparatus may include means for monitoring for a set of transport blocks from a base station, failing to decode one or more transport blocks of the set of transport blocks, transmitting one or more negative acknowledgments to the base station indicating that the UE failed to decode the one or more transport blocks, and receiving one or more outer-coded transport blocks each including one or more combinations of transport blocks of the set of transport blocks based on transmitting the one or more negative acknowledgments.

Another innovative aspect of the subject matter described in this disclosure can be implemented in a non-transitory computer-readable medium storing code for wireless communication at a UE. The code may include instructions executable by a processor to monitor for a set of transport blocks from a base station, fail to decode one or more transport blocks of the set of transport blocks, transmit one or more negative acknowledgments to the base station indicating that the UE failed to decode the one or more transport blocks, and receive one or more outer-coded transport blocks each including one or more combinations of transport blocks of the set of transport blocks based on transmitting the one or more negative acknowledgments.

Another innovative aspect of the subject matter described in this disclosure can be implemented in a method of wireless communication at a base station. The method may include multicasting a set of transport blocks to one or more UEs, detecting negative acknowledgment feedback on one or more shared negative acknowledgment resources, the negative acknowledgement feedback indicating that one or more of the one or more UEs failed to decode one or more transport blocks of the set of transport blocks, and multicasting one or more outer-coded transport blocks each including a combination of transport blocks of the set of transport blocks based on detecting the negative acknowledgment feedback.

Another innovative aspect of the subject matter described in this disclosure can be implemented in an apparatus for wireless communication at a base station. The apparatus may include a processor, memory coupled with the processor, and instructions stored in the memory. The instructions may be executable by the processor to cause the apparatus to multicast a set of transport blocks to one or more UEs, detect negative acknowledgment feedback on one or more shared negative acknowledgment resources, the negative acknowledgement feedback indicating that one or more of the one or more UEs failed to decode one or more transport blocks of the set of transport blocks, and multicast one or more outer-coded transport blocks each including a combination of transport blocks of the set of transport blocks based on detecting the negative acknowledgment feedback.

Another innovative aspect of the subject matter described in this disclosure can be implemented in an apparatus for wireless communication at a base station. The apparatus may include means for multicasting a set of transport blocks to one or more UEs, detecting negative acknowledgment feedback on one or more shared negative acknowledgment resources, the negative acknowledgement feedback indicating that one or more of the one or more UEs failed to decode one or more transport blocks of the set of transport blocks, and multicasting one or more outer-coded transport blocks each including a combination of transport blocks of the set of transport blocks based on detecting the negative acknowledgment feedback.

Another innovative aspect of the subject matter described in this disclosure can be implemented in a non-transitory computer-readable medium storing code for wireless communication at a base station. The code may include instructions executable by a processor to multicast a set of transport blocks to one or more UEs, detect negative acknowledgment feedback on one or more shared negative acknowledgment resources, the negative acknowledgement feedback indicating that one or more of the one or more UEs failed to decode one or more transport blocks of the set of transport blocks, and multicast one or more outer-coded transport blocks each including a combination of transport blocks of the set of transport blocks based on detecting the negative acknowledgment feedback.

DETAILED DESCRIPTION

Figure 1:
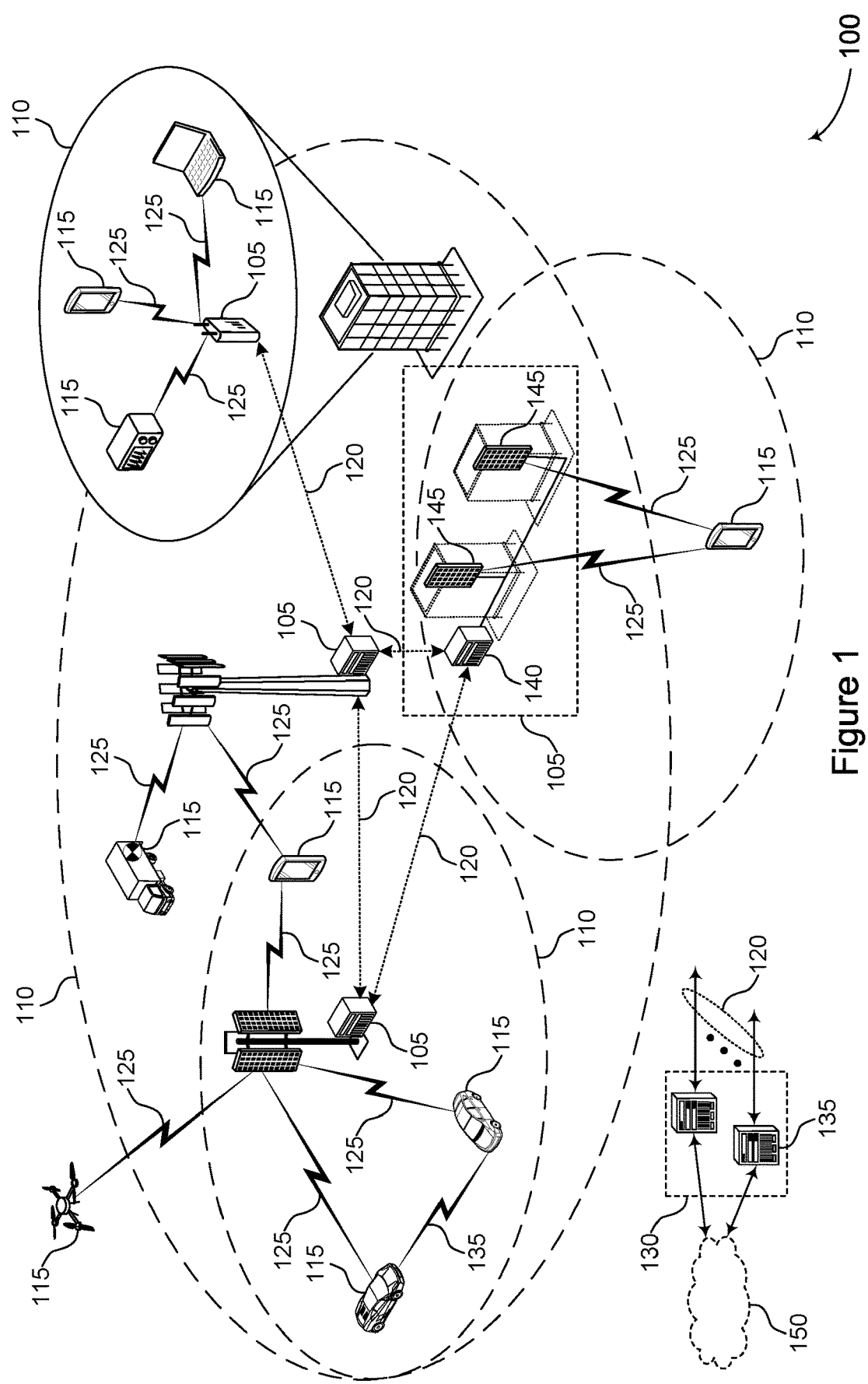
FIG. 1 illustrates an example of a wireless communications system that supports multicast feedback and retransmission for transport block grouping in accordance with aspects of the present disclosure.

In some wireless communications systems, a base station may multicast or broadcast data in the form of transport blocks to one or more user equipments (UEs). In some implementations, the base station may group transport blocks in a set, and the base station may multicast or broadcast the set of transport blocks to the one or more UEs. If a UE fails to decode one of the transport blocks in the set, the UE may transmit feedback, such as a negative acknowledgment (NACK), to the base station to trigger a retransmission of the transport block. To limit overhead, multiple UEs may share resources for reporting feedback per transport block. For example, if multiple UEs fail to decode the same transport block in the set of transport blocks, the UEs may report feedback, such as a NACK, on the same resource. In some examples, however, due to interference, the UEs may fail to decode different transport blocks, and a base station may receive feedback for multiple transport blocks. Further, as the quantity of the UEs increases, the probability that the base station receives feedback, such as a NACK, for each transport block may also increase. As a result, the base station may retransmit information in a large portion or all of the transport blocks in the set of transport blocks, and the overhead of the multicast transmissions may be high (for example, due to the NACK feedback and the retransmission of the transport blocks).

Various aspects generally relate to techniques for multicast feedback, and more specifically to techniques for allocating resources for multicast feedback from one or more UEs to a base station and retransmitting information in transport blocks from the base station to the one or more UEs. In some examples, if a UE fails to decode one or more transport blocks of a set of transport blocks from a base station, the UE may report feedback to the base station. Rather than reporting the feedback per transport block, however, the UE may report the feedback, such as a NACK, for one or more transport blocks. The base station may receive the feedback from the UE and potentially receive other feedback from other UEs that also failed to decode one or more transport blocks. The base station may then multicast one or more outer-coded transport blocks to the UEs based on the feedback. Each of the outer-coded transport blocks may include a different combination (for example, a linear combination) of transport blocks of the set of transport blocks. The one or more UEs may use the outer-coded transport blocks including the different combination of transport blocks and one or more successfully decoded transport blocks of the set of transport blocks to decode the information from the one or more transport blocks that the UE originally failed to decode.

Particular aspects of the subject matter described in this disclosure may be implemented to realize one or more of the following potential advantages. The techniques employed by the described communication devices may provide benefits and enhancements to the operation of the communication devices, including UEs and base stations. For example, operations performed by the described communication devices may provide improvements to multicast feedback techniques by reducing a quantity of transport blocks that are re-transmitted by a base station in response to feedback (e.g., ACK, NACK) received from a set of UEs. In some implementations, the operations performed by the described communication devices to reduce the quantity of transport blocks re-transmitted by the base station may thereby result in more efficient resource utilization, and may decrease signaling overhead within a wireless communications system. In some other implementations, a set of UEs may be configured with a shared set of resources for reporting NACK feedback for a set of transport blocks, which may further reduce signaling overhead within the wireless communications system.

Aspects of the disclosure introduced above are described below in the context of a wireless communications system. Examples of processes and signaling exchanges that support multicast feedback and retransmission for transport block grouping are then described. Aspects of the disclosure are further illustrated by and described with reference to apparatus diagrams, system diagrams, and flowcharts that relate to multicast feedback and retransmission for transport block grouping.

FIG. 1 illustrates an example of a wireless communications system 100 that supports multicast feedback and retransmission for transport block grouping in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame quantity (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a quantity of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ feedback may include an acknowledgment (ACK) indicating that a transmission is successfully received and decoded and HARQ may include a combination of error detection (for example, using a cyclic redundancy check (CRC)), forward error correction (FEC), and retransmission (for example, automatic repeat request (ARQ)). HARQ may improve throughput at the media access control (MAC) layer in poor radio conditions (for example, low signal-to-noise conditions). In some examples, a device may support same-slot HARQ feedback, in which the device may provide HARQ feedback in a specific slot for data received in a previous symbol in the slot. In other examples, the device may provide HARQ feedback in a subsequent slot, or according to some other time interval.

In wireless communications system 100, a base station 105 may multicast or broadcast data in the form of transport blocks to one or more UEs 115. If a UE 115 fails to decode each transport block, the UE 115 may transmit a NACK to the base station to trigger a retransmission of the transport block. The base station and the UE 115 may support HARQ feedback and retransmission to improve a quality of service (QoS). In some systems, the UE 115 may reuse unicast ACK or NACK for reporting HARQ feedback per transport block for multicast transmissions. In such systems, however, a base station 105 may configure respective uplink resources for multicast users, and feedback overhead may be increased with an increasing quantity of multicast users. To limit overhead, multiple UEs 115 may share resources for reporting NACK feedback for a set of transport blocks. For example, if multiple UEs 115 fail to decode a transport block, the UEs 115 may report a NACK on the same NACK resource for the transport block. The use of shared uplink resources for reporting NACKs may reduce overhead, and overhead may also be reduced because a UE 115 may only send a NACK if the UE 115 fails to decode multicast data (for example, the UE 115 may avoid transmitting ACKs). Further, feedback overhead or feedback resource overhead may be independent on the quantity of multicast users.

In some examples, due to different interferences, the UEs 115 may fail to decode different transport blocks. In such examples, each UE 115 may report a NACK for the transport block that the UE 115 failed to decode, and the base station 105 may receive a NACK for each of multiple transport blocks. Further, as the quantity of UEs 115 increases, and the base station 105 configures NACK feedback per transport block, the probability that the base station 105 receives a NACK for each transport block may also increase. As an example, if one UE 115 is monitoring for multicast transport blocks from the base station 105, there may be a block error rate (BLER) of 1%. If ten UEs 115 are monitoring for multicast transport blocks from the base station 105, the probability that the UEs 115 send at least one NACK may be 10%. If 100 UEs 115 are monitoring for multicast transport blocks from the base station 105, the probability that the UEs 115 send at least one NACK may be 63%.

Figure 2:
FIG. 2 illustrates an example of a set of transport blocks multicast by a base station to one or more user equipment (UEs) in accordance with aspects of the present disclosure.

FIG. 2 illustrates an example of a set of transport blocks 200 multicast by a base station to multiple UEs in accordance with aspects of the present disclosure. At least one of the UEs 115 may fail to decode each transport block in the set of transport blocks. For example, a first UE 115 (UE 1) may fail to decode a second transport block (TB2) but successfully decode a first transport block (TB1) and a third transport block (TB3), a second UE 115 (UE 2) may fail to decode the first transport block (TB1) but successfully decode the second transport block (TB2) and the third transport block (TB3), and a third UE 115 (UE 3) may fail to decode the third transport block (TB3) but successfully decode the first transport block (TB1) and the second transport block (TB2). Thus, at least one UE 115 may transmit a NACK to the base station 105 for each transport block, and the base station 105 may retransmit information in all transport blocks in the set of transport blocks. If a base station 105 configures NACK feedback for a set of transport blocks, and multiple UEs 115 monitor for the set of transport blocks, the base station 105 may receive NACKs for a large portion of transport blocks (as shown in FIG. 2). As a result, the base station 105 may retransmit information in a large portion (or all) of the transport blocks in the set of transport blocks, and the overhead of multicast transmissions may be high (for example, due to NACK feedback and the retransmission of transport blocks).

Wireless communications system 100 may support efficient techniques for allocating resources for multicast feedback from multiple UEs 115 and retransmitting information in transport blocks to the multiple UEs 115. As discussed above, if a UE 115 fails to decode one or more transport blocks of a set of transport blocks from a base station 105, the UE 115 may report a NACK to the base station 105. However, rather than reporting the NACK per transport block, the UE 115 may report a NACK for one or more transport blocks (for example, the collective set of transport blocks). The base station 105 may receive the NACK from the UE 115 and potentially other NACKs from other UEs 115, and the base station 105 may multicast one or more outer-coded transport blocks to the UEs 115. An outer-coded transport block may refer to a transport block that includes a combination of other transport blocks. The quantity of outer-coded transport blocks multicast by the base station 105 may correspond to the quantity of transport blocks that the UEs 115 failed to decode. That is, the base station 105 may configure UE feedback for a set (or group) of transport blocks and transmit the outer-coded transport blocks as a retransmission based on the reported quantity of transport blocks that the UEs 115 failed to decode. The transport blocks that a UE 115 fails to decode may be referred to as error transport blocks. Each of the outer-coded transport blocks may include a different combination (for example, a linear combination) of transport blocks of the set of transport blocks. Thus, a UE 115 may use the outer-coded transport blocks and one or more previously successfully-decoded transport blocks of the set of transport blocks to decode the one or more transport blocks that the UE 115 originally failed to decode.

Because a UE 115 may transmit a NACK for the set of transport blocks, the overhead associated with reporting NACK feedback may be reduced. Further, because the base station 105 may transmit outer-coded transport blocks (for example, retransmit information in transport blocks in the form of outer-coded transport blocks) rather than each transport block in a set of transport blocks, the overhead associated with retransmitting information in transport blocks may be reduced. The base station 105 may not need to know which transport blocks each UE 115 failed to decode. If at least one UE 115 reports one error transport block and no other UEs 115 report more than one error transport block, the base station 105 may transmit one outer-coded transport block including a combination of transport blocks in the set of transport blocks. In the example of FIG. 2, each of the UEs 115 would report one error transport block, and the base station 105 would transmit one outer-coded transport block (C0) including a combination of TB1, TB2, and TB3 (for example, C0=TB1+TB2+TB3). Each UE 115 may then recover a respective error transport block using the outer-coded transport block and successfully decoded transport blocks in the set of transport blocks. For example, if C0 includes a linear combination of TB1, TB2, and TB3 corresponding to a linear equation: C0=TB1+TB2+TB3, UE 1 may identify TB2 by solving for the linear equation using C0, TB1, and TB3 (for example, TB2'=C0+TB1+TB3). Similarly, UE 2 may identify TB1 by solving for the linear equation using C0, TB2, and TB3 (for example, TB1=C0+TB2+TB3). Further, UE 3 may identify TB3 by solving for the linear equation using C0, TB1, and TB2 (for example, TB3'=C0+TB1+TB2).

Figure 3:
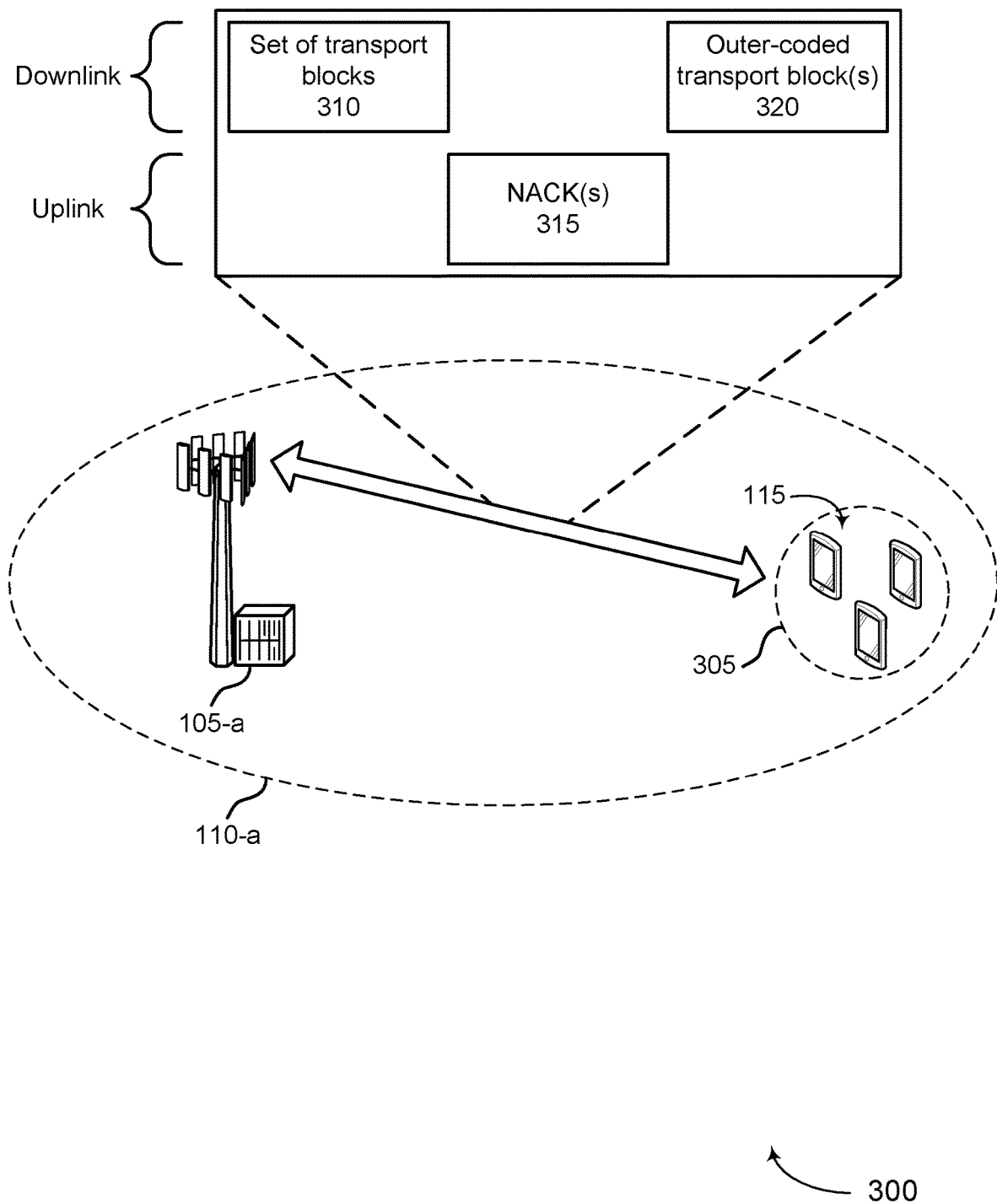
FIG. 3 illustrates an example of a wireless communications system that supports multicast feedback and retransmission for transport block grouping in accordance with aspects of the present disclosure.

FIG. 3 illustrates an example of a wireless communications system 300 that supports multicast feedback and retransmission for transport block grouping in accordance with aspects of the present disclosure. The wireless communications system 300 includes a UE group 305, which may include UEs 115 as described with reference to FIGS. 1 and 2. The wireless communications system 300 also includes a base station 105-*a*, which may be an example of a base station 105 described with reference to FIGS. 1 and 2. The base station 105-*a* may provide communication coverage for a coverage area 110-*a*. The wireless communications system 300 may implement aspects of wireless communications system 100. For example, the wireless communications system 300 may support efficient techniques for allocating resources for multicast feedback from multiple UEs 115 (for example, in the UE group 305) and retransmitting information in transport blocks to the multiple UEs 115.

The base station 105-*a* may multicast a set of transport blocks 310 to multiple UEs 115 in the UE group 305. In the example of FIG. 3, the UEs 115 in the UE group 305 may fail to decode one or more transport blocks of the set of transport blocks 310. Thus, the UEs 115 may transmit one or more NACKs 315 to the base station 105-*a* indicating that the UEs 115 failed to decode the one or more transport blocks of the set of transport blocks 310. The base station 105-*a* may receive the one or more NACKs 315 on corresponding NACK resources (for example, the base station 105-*a* may detect energy above a threshold on the corresponding NACK resources). The base station 105-*a* may then multicast one or more outer-coded transport blocks 320 to the multiple UEs 115 in the UE group 305.

In some implementations, a UE 115 in the UE group 305 may transmit a NACK 315 on a shared NACK resource that indicates a quantity of the transport blocks that the UE 115 failed to decode. In such implementations, the base station 105-*a* may configure NACK resources (for example, M+1 NACK resources) for the set of transport blocks 310 (for example, N transport blocks), and each UE 115 in the UE group 305 may use these NACK resources to report the quantity of the transport blocks that the UE 115 failed to decode (for example, the quantity of error transport blocks). The value M may correspond to a threshold or a maximum quantity of outer-coded transport blocks that the base station 105-*a* may transmit to the UEs 115 in the UE group 305. Thus, the base station 105-*a* may configure M of the M+1 NACK resources for reporting an exact quantity of error transport blocks (for example, 1 . . . M). In such examples, the k-th NACK resource, in which k=1, 2, . . . , M, may be allocated for UEs 115 with k error transport blocks. For example, a UE 115 in the UE group 305 that fails to decode two transport blocks of the set of transport blocks may transmit one NACK 315 on the $2^{nd}$ NACK resource, and the base station 105-*a*, based on receiving the NACK 315 on the $2^{nd}$ NACK resource, may determine that the UE 115 failed to decode two transport blocks. Further, the base station 105-*a* may configure the last NACK resource (for example, the (M+1)-th NACK resource) for indicating that the quantity of error transport blocks exceeds the threshold or the maximum quantity of outer-coded transport blocks (for example, for UEs 115 with more than M error transport blocks).

The base station 105-*a* may transmit control signaling (for example, radio resource control (RRC) signaling, control information in a multicast control channel (MCCH), or downlink control information (DCI)) to indicate the quantity N of the set of transport blocks 310. In some aspects, parameters for the M+1 NACK resources (for example, the number M, the phase shifts or cyclic shifts to different M+1 physical uplink control channel (PUCCH) sequences) may be predefined or configured by RRC signaling or control information in an MCCH. Further, the time and frequency resources allocated for the NACK feedback (for example, the PUCCH) may be indicated by RRC, control information in an MCCH, or DCI. The base station 105-*a* may send DCI to schedule the transmission of the set of transport blocks 310 and also to trigger multicast UEs 115 with error transport blocks to transmit a NACK 315 on one of the M+1 shared NACK resources to the base station 105-*a* after the transmission of the set of transport blocks 310. Alternatively, the base station 105-*a* may send one DCI per transport block in the set of transport blocks 310 without triggering feedback from a multicast UE 115 until the last transport block in the set of transport blocks 310, where the DCI for the last transport block may trigger multicast UEs 115 with error transport blocks to transmit a NACK 315 on one of the (M+1) shared NACK resources to the base station 105-*a* after the transmission of the set of transport blocks 310.

Each UE 115 in the UE group 305 may report a single NACK 315 in a NACK resource (for example, no more than one NACK resource), where the NACK resource corresponds to the quantity of error transport blocks at the UE 115. If a UE 115 in the UE group 305 successfully decodes all transport blocks in the set of transport blocks 310 correctly, the UE 115 may not transmit a NACK 315. If the UE 115 does fail to decode at least one transport block, the UE 115 may transmit the NACK 315 on a NACK resource corresponding to the quantity of transport blocks that the UE 115 failed to decode (that is, the quantity of error transport blocks at the UE 115).

The base station 105-*a* may retransmit information in the previously transmitted transport blocks to the UEs 115 in the UE group 305 based on a highest quantity of reported error transport blocks at one of the UEs 115 in the UE group. In particular, the base station 105-*a* may transmit a quantity of outer-coded transport blocks 320 to the UEs 115 equal to the highest quantity of the reported transport blocks that one of the UEs 115 in the UE group 305 failed to decode. For example, if a first UE 115 in the UE group 305 fails to decode one transport block of the set of transport blocks 310, a second UE 115 in the UE group 305 fails to decode two transport blocks of the set of transport blocks 310, and no other UEs 115 in the UE group 305 fails to decode more than two transport blocks of the set of transport blocks 310, the base station 105-*a* may transmit two outer-coded transport blocks 320 to the UEs 115 in the UE group 305.

In other implementations, a UE 115 in the UE group 305 that fails to decode at least one of the transport blocks in the set of transport blocks 310 may transmit a NACK 315 on a shared NACK resource indicating that the UE 115 failed to decode at least one of the transport blocks of the set of transport blocks 310. In such implementations, the base station 105-*a* may configure one NACK resource for the set of transport blocks 310 (for example, for a group of N transport blocks at a time). The base station 105-*a* may send DCI to schedule the transmission of a set of transport blocks 310 and also to trigger multicast UEs 115 with error transport blocks to transmit a NACK 315 on the shared NACK resource to the base station 105-*a* after the transmission of the set of transport blocks 310. Alternatively, the base station 105-*a* may send one DCI per transport block in the set of transport blocks 310 without feedback from a multicast UE 115 until the last one in the set of transport blocks 310, where the DCI for the last transport block may trigger multicast UEs 115 with error transport blocks to transmit a NACK 315 on the shared NACK resource to the base station 105-*a*. Once the base station 105-*a* receives a NACK 315 from any of the UEs 115 in the UE group 305, the base station 105-*a* may send DCI to transmit an outer-coded transport block 320 to the UEs 115 in the UE group 305 and also trigger each UE 115 (for example, multicast UE 115) to transmit feedback if the UE 115 requests another outer-coded transport block 320. That is, the base station 105-*a* may transmit outer-coded transport blocks 320 one by one based on NACK feedback.

A UE 115 in the UE group 305 may continue transmitting a NACK 315 after receiving each outer-coded transport block 320 if the UE 115 is unable to decode at least one transport block of the set of transport blocks 310 after receiving the outer-coded transport block 320. Accordingly, the base station 105-*a* may continue multicasting outer-coded transport blocks 320 to the UEs 115 in the UE group 305 until each UE 115 successfully decodes all of the transport blocks (for example, until the base station 105-*a* does not receive a NACK 315 after transmitting an outer-coded transport block 320) or until a maximum quantity (M) of outer-coded transport blocks 320 are transmitted. That is, the base station 105-*a* may trigger each UE 115 in the UE group 305 to transmit a NACK 315 in a shared NACK resource up to M times. Thus, each UE 115, after receiving an outer-coded transport block 320, that still fails to decode at least one transport block, may again transmit a NACK 315 to the base station 105-*a* using a NACK resource indicating that the UE 115 failed to decode the at least one transport block. The base station 105-*a* may transmit control signaling (for example, RRC signaling, control information in a multicast control channel MCCH, or DCI) to indicate the quantity N of the set of transport blocks. Further, the base station 105-*a* may indicate the time and frequency resources allocated for the NACK feedback (for example, the PUCCH) by RRC, control information in an MCCH, or DCI.

For up to M error transport blocks, the base station 105-*a* may transmit an equal number (for example, up to M) outer-coded transport blocks 320, and the base station 105-*a* may generate the outer-coded transport blocks 320 based on a coding scheme (for example, Reed Solomon (RS) coding scheme). As an example, an outer-coded transport block 320 may be defined as: $C_j = \Sigma_{i=1}^{N} \alpha_{i,j} TB_i, j=1 \ldots M$, in which the summation is in a finite field (for example, the finite field: $GF(Z=2^x)$). The alpha value $\alpha_{i,1}$ may be equal to one, and other alpha values may be preconfigured or defined as: $\alpha_{i,j}=i.j=2 \ldots M$ or $\alpha_{i,j}=a_j^{i-1}, j=2 \ldots M$. The set of $\alpha_j$ values ($\{\alpha_j\}$) may be the primitive elements of GF(Z), and the values N and M, where N=Z−1 for M error transport blocks, may be based on RS(N,N−2M). Further, the set of $\alpha_j$ values ($\{\alpha_j\}$) may be defined or configured by RRC or MCCH to avoid blind detection at a UE 115. Thus, up to M error transport blocks may be recovered by using the configured outer coded transport blocks: $C_1 = \Sigma_{i=1}^{N} \alpha_{i,j} TB_1, j=1 \ldots M$. In some examples, if any of the UEs 115 failed to decode more than M error transport blocks, the outer-coded transport blocks may not be sufficient to successfully decode the remaining error transport blocks and as such, the base station 105-*a* may retransmit the entire set of transport blocks 310.

As an example, for N=2, and M=1, the base station 105-*a* may transmit a single outer-coded transport block: $C_1=TB_1+TB_2$. For N=3, and M=2, the base station 105-*a* may transmit up to two outer-coded transport blocks: $C_1=TB_1+TB_2+TB_3$ and $C_2=TB_1+2TB_2+3TB_3$ or $C_2=TB_1+3TB_2+5TB_3$. For N=4, and M=3, the base station 105-*a* may transmit up to three outer-coded transport blocks: $C_1=TB_1+TB_2+TB_3+TB_4$, $C_2=TB_1+2TB_2+3TB_3+4TB_4$, and $C_3=TB_1+3TB_2+5TB_3+7TB_4$. In some aspects, wireless communications system 300 may support other values of N and M based on RS(Z−1, Z−1−2M). For example, wireless communications system 300 may support N=15 and M=3 based on RS(15,9), N=31 and M=8 based on RS(31,15), and N=255 and M=16 based on RS(255,223). The wireless communications system 300 may support a large value of N (for example, N>2M) to recover M bursty error transport blocks. However, to support the large N value, the buffer size at a UE 115 may need to support N transport blocks, and the UE 115 may experience high latency for retransmissions of the transport blocks.

As described above, the base station 105-*a* may transmit DCI to indicate one or more than one outer-coded transport blocks in a multicast transmission. For the set of transport blocks 310 (for example, a group of N transport blocks), the DCI may indicate up to M outer-coded transport blocks 320 for retransmission. In one example, a single multi-transport-block DCI may use $\lceil \log_2 (M+1) \rceil$ bits to indicate a group of outer-coded transport blocks 320 (for example, up to M outer-coded transport blocks 320). The multi-transport-block DCI may also include common scheduling information (for example, random access information or a modulation and coding scheme (MCS)) for a group of indicated transport blocks. Table 1 illustrates an example of using DCI to indicate outer-coded transport blocks 320 with M=3.

TABLE 1

| DCI used to indicate outer-coded transport blocks | |
|---|---|
| DCI field | Outer-coded transport blocks |
| 00 | $C_1$ |
| 01 | $C_1, C_2$ |
| 10 | $C_1, C_2, C_3$ |
| 11 | $TB_1, TB_2, TB_3, TB_4$ |

In another example, DCI may be transmitted on an individual-outer-coded-transport-block basis. For example, the base station 105-*a* may transmit M DCIs for M respective outer-coded transport blocks 320. That is, the base station 105-*a* may independently schedule each outer-coded transport block 320 for retransmission. In this example, a UE 115 in the UE group 305 may detect the quantity of DCIs corresponding to the quantity of error transport blocks at the UE 115 (for example, m DCIs for m error transport blocks, in which m is less than or equal to M). In the example described above in which the DCI triggers NACK feedback from a UE 115, the base station 105-*a* may use the same DCI used to trigger NACK feedback to indicate an outer-coded transport block 320. In some cases, the base station 105-*a* may use an outer-coded transport block-specific radio network temporary identifier (RNTI) or a flag bit in DCI to differentiate outer-coded transport blocks 320 from other transport blocks.

Using the techniques described herein, the feedback from UEs 115 may be reduced. In one example, after receiving a set of transport blocks 310, a UE 115 may transmit a NACK 315 on a single NACK resource to indicate a quantity of error transport blocks (for example, rather than transmitting a NACK per transport block). In another example, after receiving a set of transport blocks 310, a UE 115 may transmit a single NACK 315 to trigger each outer-coded transport block 320 transmission from a base station 105. In this example, the UE 115 may transmit a NACK 315 m times if the UE 115 has m error transport blocks. Additionally, the overhead for retransmitting information in the transport blocks may be reduced. For M error transport blocks, the base station 105-a may transmit M outer-coded transport blocks 320 even if different UEs 115 failed to decode different transport blocks. In such a manner, the base station 105-a may avoid retransmitting the entire set of all N transport blocks (for example, as is done when UEs 115 are configured to report NACKs 315 per transport block). Conversely, if at least one UE 115 has more than M error transport blocks, the base station 105-a may avoid transmitting outer-coded transport blocks 320. Instead, the base station 105-a may retransmit the transport blocks (for example, rather than transmitting outer-coded transport blocks 320 each including a combination of the transport blocks). Table 2 illustrates an example of outer-coded transport block 320 transmissions based on NACK feedback as described herein.

TABLE 2

Outer-coded transport block transmissions based on NACK feedback

| | NACK resource 1 | NACK resource 2 | NACK resource n | NACK resource M | Outer-coded transport blocks for retransmission |
|---|---|---|---|---|---|
| Case 1: One error transport block | Yes | No | No | No | $C_1$ |
| Case 2: Up to two error transport blocks | Yes/No | Yes | No | No | $C_1, C_2$ |
| ... | | | | | ... |
| Case M: Up to M error transport blocks | Yes/No | Yes/No | Yes/No | Yes | $C_1, C_2, \ldots, C_M$ |

Figure 4:
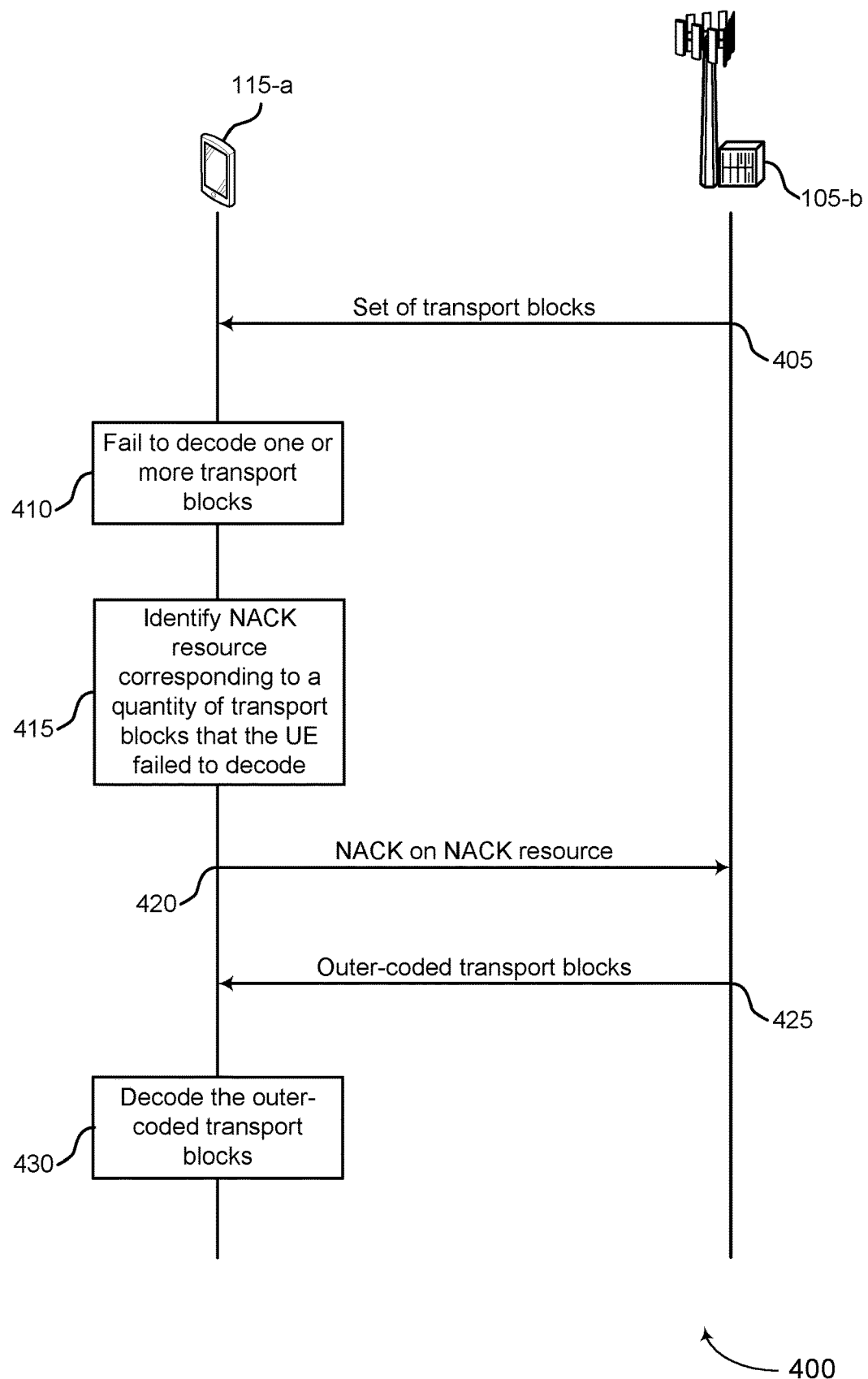
FIG. 4 illustrates an example of a process flow that supports multicast feedback and retransmission for transport block grouping in accordance with aspects of the present disclosure.

FIG. 4 illustrates an example of a process flow 400 that supports multicast feedback and retransmission for transport block grouping in accordance with aspects of the present disclosure. Process flow 400 illustrates aspects of techniques performed by a UE 115-a, which may be an example of a UE 115 described with reference to FIGS. 1-3. Process flow 400 also illustrates aspects of techniques performed by a base station 105-b, which may be an example of a base station 105 described with reference to FIGS. 1-3. Process flow 400 may support efficient techniques for allocating resources for multicast feedback (for example, NACK feedback that may be transmitted over shared resources) from multiple UEs 115 and retransmitting information in transport blocks to one or more of the multiple UEs 115. Although the features described with reference to FIG. 4 are described from the perspective of one UE 115-a, the operations and the process may be performed by and related to one or more UEs 115, including that the one or more UEs 115 may transmit feedback over shared resources and may receive broadcast or multicast information that is transmitted by the base station 105-b. At 405, a base station 105-b may multicast a set of transport blocks to one or more UEs 115 including the UE 115-a. The UE 115-a may monitor for the set of transport blocks from the base station 105-b, and, at 410, the UE 115-a may fail to decode one or more transport blocks of the set of transport blocks.

At 415, the UE 115-a may determine a quantity of the transport blocks that the UE 115-a failed to decode, and the UE 115-a may identify a NACK resource corresponding to the quantity of transport blocks that the UE 115-a failed to decode. In some aspects, the UE 115-a may receive one or more indications of NACK resources allocated for transmitting NACKs to the base station 105-b, and each NACK resource may correspond to a different quantity of transport blocks that the UE 115-a failed to decode. One or more of the NACK resources may indicate that a quantity of transport blocks that the UE 115-a failed to decode is above a maximum quantity of the outer-coded transport blocks, and one or more of the NACK resources may indicate the quantity of transport blocks that the UE 115-a failed to decode.

At 420, the UE 115-a may transmit a NACK on the NACK resource corresponding to the quantity of transport blocks that the UE 115-a failed to decode. At 425, the UE 115-a may then receive one or more outer-coded transport blocks from the base station 105-b based on transmitting the one or more NACKs. In particular, the UE 115-a may receive at least a quantity of outer-coded transport blocks equal to the quantity of the one or more transport blocks that the UE 115-a failed to decode or equal to a maximum quantity of the outer-coded transport blocks. If another UE 115 failed to decode more transport blocks than the UE 115-a, the UE 115-a may receive a quantity of outer-coded transport blocks greater than the quantity of the one or more transport blocks that the UE 115-a failed to decode. In such examples, the UE 115-a may only monitor for the quantity of outer-coded transport blocks equal to the quantity of the one or more transport blocks that the UE 115-a failed to decode. Each outer-coded transport block may include a combination of transport blocks of the set of transport blocks.

In some implementations, the UE 115-a may receive at least a subset of the one or more outer-coded transport blocks in a single multicast transmission, and the UE 115-a may receive DCI in the single multicast transmission indicating the at least the subset of outer-coded transport blocks included in the single multicast transmission. In such implementations, the base station 105-b may transmit control information in a downlink control channel indicating the at least the subset of outer-coded transport blocks, and the base station 105-b may transmit the subset of outer-coded transport blocks in the downlink control channel. In other implementations, the UE 115-a may receive each of the one or more outer-coded transport blocks in a respective multicast transmission, and the UE 115-a may receive DCI in each respective multicast transmission indicating an outer-coded transport block included in the respective multicast transmission. In such implementations, the base station 105-b may transmit control information in a downlink control channel indicating the outer-coded transport block, and the base station 105-b may transmit the outer-coded transport block in the downlink control channel.

At 430, the UE 115-a may then decode the outer-coded transport blocks including the combination of the set of transport blocks to identify the transport blocks that the UE 115-a failed to decode originally (for example, at 410). For example, the UE 115-a may reduce the outer-coded transport blocks using the successfully decoded transport blocks in the set of transport blocks to identify the transport blocks that the UE 115-a failed to decode. In some implementations, the UE 115-a may determine a coding scheme (for example, Reed Solomon coding scheme) used to encode the one or more outer-coded transport blocks, and the UE 115-a may apply the one or more successfully decoded transport blocks to the one or more outer-coded transport blocks to decode the one or more transport blocks that the UE failed to decode originally based on the coding scheme.

The combination of the transport blocks of the set of transport blocks in an outer-coded transport block may be a linear combination. As an example, the base station 105-b may perform an exclusive or (XOR) operation on the transport blocks of the set of transport blocks to generate the outer-coded transport block. In some aspects, the base station 105-b may apply a weight to each transport block in the combination of transport blocks in an outer-coded transport block. In some implementations, the weight applied by the base station 105-b to each transport block may be preconfigured at the UE 115-a and the base station 105-b, and the UE 115-a may autonomously determine the weight applied by the base station 105-b to each transport block (for example, without signaling from the base station 105-b). In other implementations, the base station 105-b may transmit, and the UE 115-a may receive, control signaling indicating the weight applied by the base station 105-b to each transport block.

Figure 5:
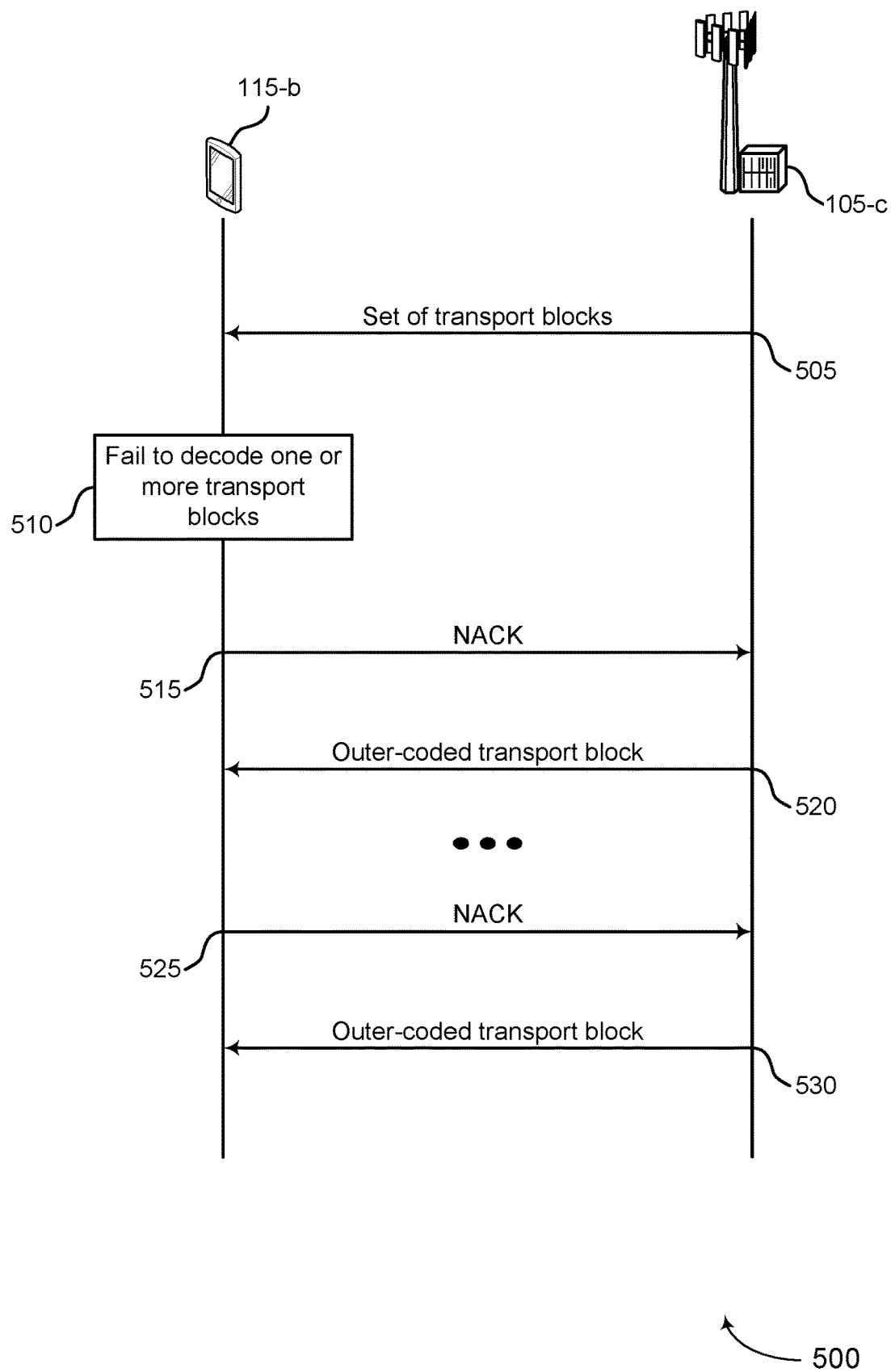
FIG. 5 illustrates an example of a process flow that supports multicast feedback and retransmission for transport block grouping in accordance with aspects of the present disclosure.

FIG. 5 illustrates an example of a process flow 500 that supports multicast feedback and retransmission for transport block grouping in accordance with aspects of the present disclosure. Process flow 500 illustrates aspects of techniques performed by a UE 115-b, which may be an example of a UE 115 described with reference to FIGS. 1-4. Process flow 500 also illustrates aspects of techniques performed by a base station 105-c, which may be an example of a base station 105 described with reference to FIGS. 1-4. Process flow 500 may support efficient techniques for allocating resources for multicast feedback (for example, NACK feedback that may be transmitted over shared resources) from multiple UEs 115 and retransmitting information in transport blocks to one or more of the multiple UEs 115. Although the features described with reference to FIG. 5 are described from the perspective of one UE 115-b, the operations and the process may be performed by and related to one or more UEs 115, including that the one or more UEs 115 may transmit feedback over shared resources and may receive broadcast or multicast information that is transmitted by the base station 105-c. At 505, a base station 105-c may multicast a set of transport blocks to one or more UEs 115 including the UE 115-b. The UE 115-b may monitor for the set of transport blocks from the base station 105-c, and, at 510, the UE 115-b may fail to decode one or more transport blocks of the set of transport blocks.

In the example of FIG. 5, because the UE 115-b failed to decode one or more transport blocks of the set of transport blocks, the UE 115-b may iteratively transmit one or more NACKs and receive one or more outer-coded transport blocks from the base station 105-c until each of the one or more transport blocks that the UE 115-b failed to decode is successfully decoded or until a maximum quantity of outer-coded transport blocks are received from the base station 105-c. For instance, at 515, the UE 115-b may transmit a first NACK to the base station 105-c indicating that the UE 115-b failed to decode one or more of the set of transport blocks, and, at 520, the UE 115-b may receive a first outer-coded transport block including a first combination of transport blocks of the set of transport blocks. However, the UE 115-b may fail to decode one or more of the set of transport blocks from the first outer-coded transport block.

Accordingly, at 525, the UE 115-b may transmit a second NACK to the base station 105-c indicating that the UE 115-b failed to decode one or more of the set of transport blocks, and the UE 115-b may receive a second outer-coded transport block including a second combination of transport blocks of the set of transport blocks. In some implementations, the UE 115-b may receive each of the one or more outer-coded transport blocks in a respective multicast transmission, and the UE 115-b may receive DCI in each respective multicast transmission indicating an outer-coded transport block included in the respective multicast transmission. In such implementations, the base station 105-c may transmit control information in a downlink control channel indicating the outer-coded transport block, and the base station 105-c may transmit the outer-coded transport block in the downlink control channel.

The UE 115-b may then decode the outer-coded transport blocks including the combination of the set of transport blocks to identify the transport blocks that the UE 115-b failed to decode originally (for example, at 510). For example, the UE 115-b may reduce the outer-coded transport blocks using the successfully decoded transport blocks in the set of transport blocks to identify the transport blocks that the UE 115-b failed to decode. In some implementations, the UE 115-b may determine a coding scheme (for example, Reed Solomon coding scheme) used to encode the one or more outer-coded transport blocks, and the UE 115-b may apply the one or more successfully decoded transport blocks to the one or more outer-coded transport blocks to decode the one or more transport blocks that the UE failed to decode originally based on the coding scheme.

The combination of the transport blocks of the set of transport blocks in an outer-coded transport block may be a linear combination. As an example, the base station 105-c may perform an XOR operation on the transport blocks of the set of transport blocks to generate the outer-coded transport block. In some aspects, the base station 105-c may apply a weight to each transport block in the combination of transport blocks in an outer-coded transport block. In some implementations, the weight applied by the base station 105-c to each transport block may be preconfigured at the UE 115-b and the base station 105-c, and the UE 115-b may autonomously determine the weight applied by the base station 105-c to each transport block (for example, without signaling from the base station 105-c). In other implementations, the base station 105-c may transmit, and the UE 115-b may receive, control signaling indicating the weight applied by the base station 105-c to each transport block.

Figure 6:
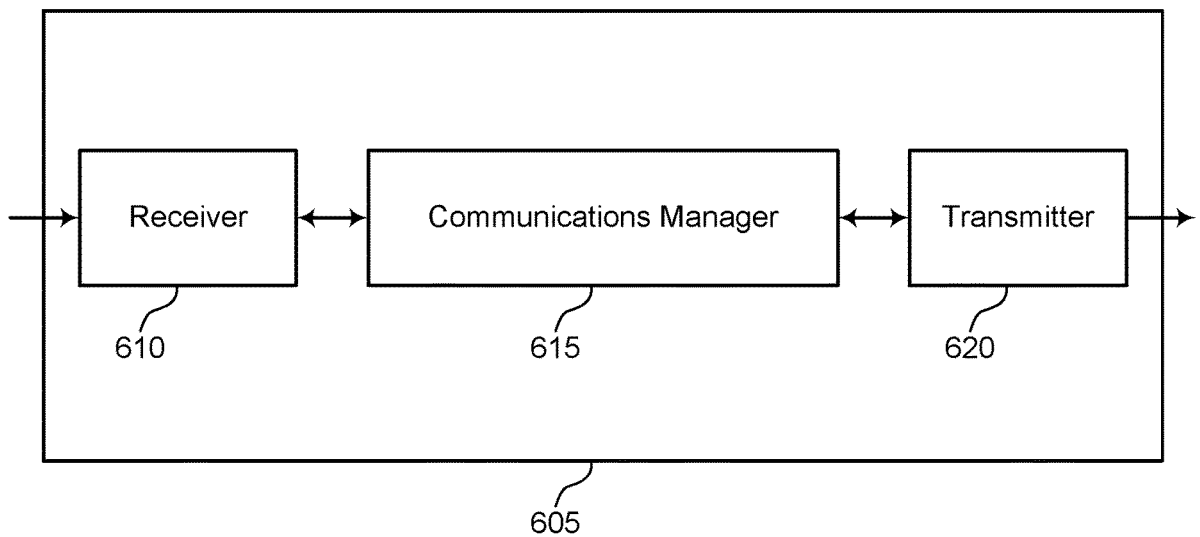
FIGS. 6 and 7 show block diagrams of devices that support multicast feedback and retransmission for transport block grouping in accordance with aspects of the present disclosure.

FIG. 6 shows a block diagram 600 of a device 605 that supports multicast feedback and retransmission for transport block grouping in accordance with aspects of the present disclosure. The device 605 may be an example of aspects of a UE 115 as described herein. The device 605 may include a receiver 610, a communications manager 615, and a transmitter 620. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to multicast feedback and retransmission for transport block grouping). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor for a set of transport blocks from a base station, fail to decode one or more transport blocks of the set of transport blocks, transmit one or more negative acknowledgments to the base station indicating that the UE failed to decode the one or more transport blocks, and receive one or more outer-coded transport blocks each including one or more combinations of transport blocks of the set of transport blocks based on transmitting the one or more negative acknowledgments.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
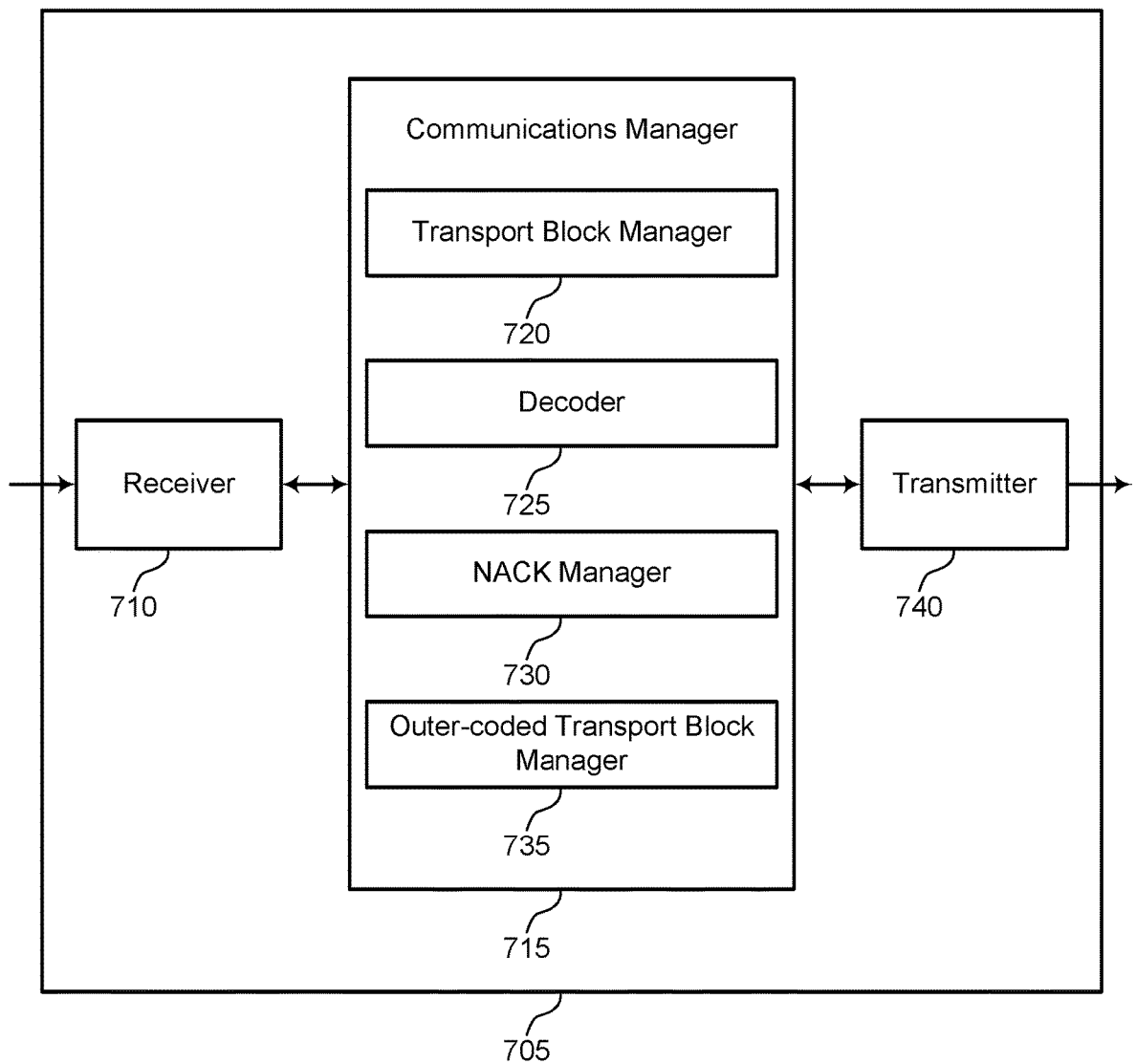

FIG. 7 shows a block diagram 700 of a device 705 that supports multicast feedback and retransmission for transport block grouping in accordance with aspects of the present disclosure. The device 705 may be an example of aspects of a device 605, or a UE 115 as described herein. The device 705 may include a receiver 710, a communications manager 715, and a transmitter 740. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to multicast feedback and retransmission for transport block grouping). Information may be passed on to other components of the device 705. The receiver 710 may be an example of aspects of the transceiver 920 described with reference to FIG. 9. The receiver 710 may utilize a single antenna or a set of antennas.

The communications manager 715 may include a transport block manager 720, a decoder 725, a NACK manager 730, and an outer-coded transport block manager 735.

The transport block manager 720 may monitor for a set of transport blocks from a base station. The decoder 725 may fail to decode one or more transport blocks of the set of transport blocks. The NACK manager 730 may transmit one or more negative acknowledgments to the base station indicating that the UE failed to decode the one or more transport blocks. The outer-coded transport block manager 735 may receive one or more outer-coded transport blocks each including one or more combinations of transport blocks of the set of transport blocks based on transmitting the one or more negative acknowledgments.

The transmitter 740 may transmit signals generated by other components of the device 705. In some examples, the transmitter 740 may be collocated with a receiver 710 in a transceiver component. For example, the transmitter 740 may be an example of aspects of the transceiver 920 described with reference to FIG. 9. The transmitter 740 may utilize a single antenna or a set of antennas.

Figure 8:
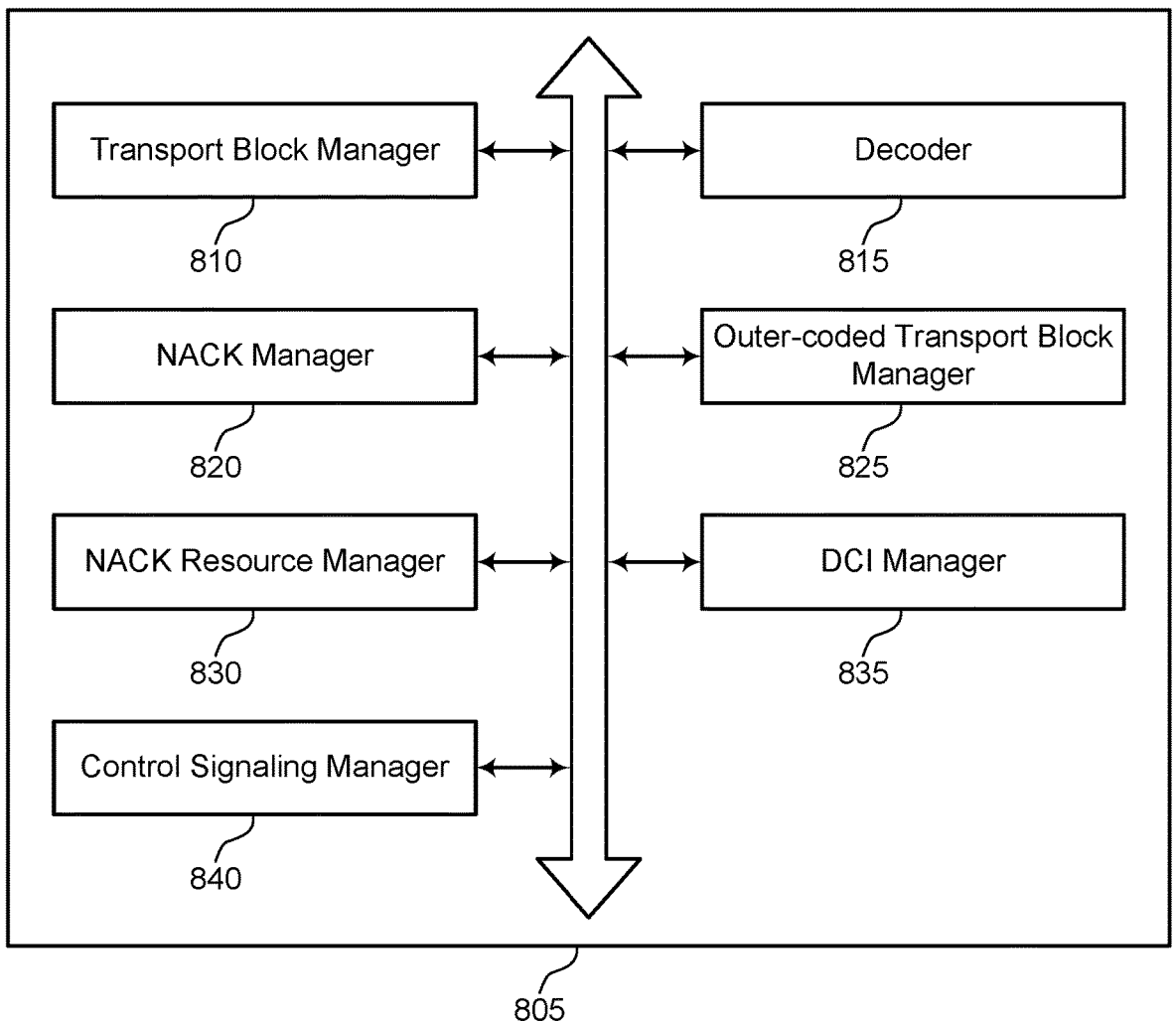
FIG. 8 shows a block diagram of a communications manager that supports multicast feedback and retransmission for transport block grouping in accordance with aspects of the present disclosure.

FIG. 8 shows a block diagram 800 of a communications manager 805 that supports multicast feedback and retransmission for transport block grouping in accordance with aspects of the present disclosure. The communications manager 805 may be an example of aspects of a communications manager 615, a communications manager 715, or a communications manager 910 described herein. The communications manager 805 may include a transport block manager 810, a decoder 815, a NACK manager 820, an outer-coded transport block manager 825, a NACK resource manager 830, a DCI manager 835, and a control signaling manager 840. Each of these components may communicate, directly or indirectly, with one another (for example, via one or more buses).

The transport block manager 810 may monitor for a set of transport blocks from a base station. The decoder 815 may fail to decode one or more transport blocks of the set of transport blocks. The NACK manager 820 may transmit one or more negative acknowledgments to the base station indicating that the UE failed to decode the one or more transport blocks. The outer-coded transport block manager 825 may receive one or more outer-coded transport blocks each including one or more combinations of transport blocks of the set of transport blocks based on transmitting the one or more negative acknowledgments.

In some examples, the NACK manager 820 may determine a quantity of the one or more transport blocks that the UE failed to decode. The NACK resource manager 830 may then determine one or more negative acknowledgment resources corresponding to the quantity of the one or more transport blocks that the UE failed to decode, and the NACK manager 820 may transmit the one or more negative acknowledgments to the base station on the one or more negative acknowledgment resources. In some examples, the outer-coded transport block manager 825 may receive a quantity of outer-coded transport blocks equal to the quantity of the one or more transport blocks that the UE failed to decode or a maximum quantity of the outer-coded transport blocks.

The NACK resource manager 830 may receive one or more indications of negative acknowledgment resources allocated for transmitting negative acknowledgments to the base station, where each negative acknowledgment resource corresponds to a different quantity of transport blocks that the UE failed to decode, and where transmitting the one or more negative acknowledgments is based on receiving the one or more indications of negative acknowledgment resources. In some examples, one or more of the negative acknowledgment resources indicate that a quantity of transport blocks that the UE failed to decode is above a maximum quantity of the outer-coded transport blocks, and where one or more of the negative acknowledgment resources indicate the quantity of transport blocks that the UE failed to decode.

In some examples, the NACK manager 820 may iteratively transmit one or more negative acknowledgments and the outer-coded transport block manager 825 may receive one or more outer-coded transport blocks until each of the one or more transport blocks that the UE failed to decode is successfully decoded or until a maximum quantity of outer-coded transport blocks are received. In some examples, the NACK manager 820 may transmit a first negative acknowledgment to the base station indicating that the UE failed to decode one or more of the set of transport blocks. In some examples, the outer-coded transport block manager 825 may receive a first outer-coded transport block including a first combination of the set of transport blocks. In some examples, the decoder 815 may fail to decode one or more of the set of transport blocks from the first outer-coded transport block. In some examples, the NACK manager 820 may transmit a second negative acknowledgment to the base station indicating that the UE failed to decode one or more of the set of transport blocks based on failing to decode the one or more of the set of transport blocks from the first outer-coded transport block. In some examples, the outer-coded transport block manager 825 may receive a second outer-coded transport block including a second combination of the set of transport blocks.

In some examples, the outer-coded transport block manager 825 may receive at least a subset of the one or more outer-coded transport blocks in a single multicast transmission, and the DCI manager 835 may receive downlink control information in the single multicast transmission indicating the at least the subset of outer-coded transport blocks included in the single multicast transmission. In some examples, the outer-coded transport block manager 825 may receive each of the one or more outer-coded transport blocks in a respective multicast transmission, and the DCI manager 835 may receive downlink control information in each respective multicast transmission indicating an outer-coded transport block included in the respective multicast transmission.

In some examples, the decoder 815 may determine a coding scheme used to encode the one or more outer-coded transport blocks. In some examples, the decoder 815 may apply one or more successfully decoded transport blocks of the set of transport blocks to the one or more outer-coded transport blocks to decode the one or more transport blocks that the UE failed to decode based on determining the coding scheme. In some examples, the coding scheme includes a Reed Solomon coding scheme. In some examples, each of the one or more outer-coded transport blocks includes a different combination of transport blocks of the set of transport blocks. In some examples, the combination of the transport blocks of the set of transport blocks includes a linear combination.

In some examples, the decoder 815 may determine a weight applied by the base station to each transport block in the combination of transport blocks in each outer-coded transport block, where the weight applied by the base station to each transport block in the combination of transport blocks in each outer-coded transport block is preconfigured at the UE. In some examples, the decoder 815 may decode each outer-coded transport block based on the determining. The control signaling manager 840 may receive control signaling indicating a weight applied by the base station to each transport block in the combination of transport blocks in each outer-coded transport blocks. In some examples, the decoder 815 may decode each outer-coded transport block based on the receiving. In some examples, the control signaling manager 840 may receive control signaling indicating a quantity of the set of transport blocks for which the UE is to monitor and indicating one or more negative acknowledgment resources allocated for transmitting the one or more negative acknowledgments.

Figure 9:
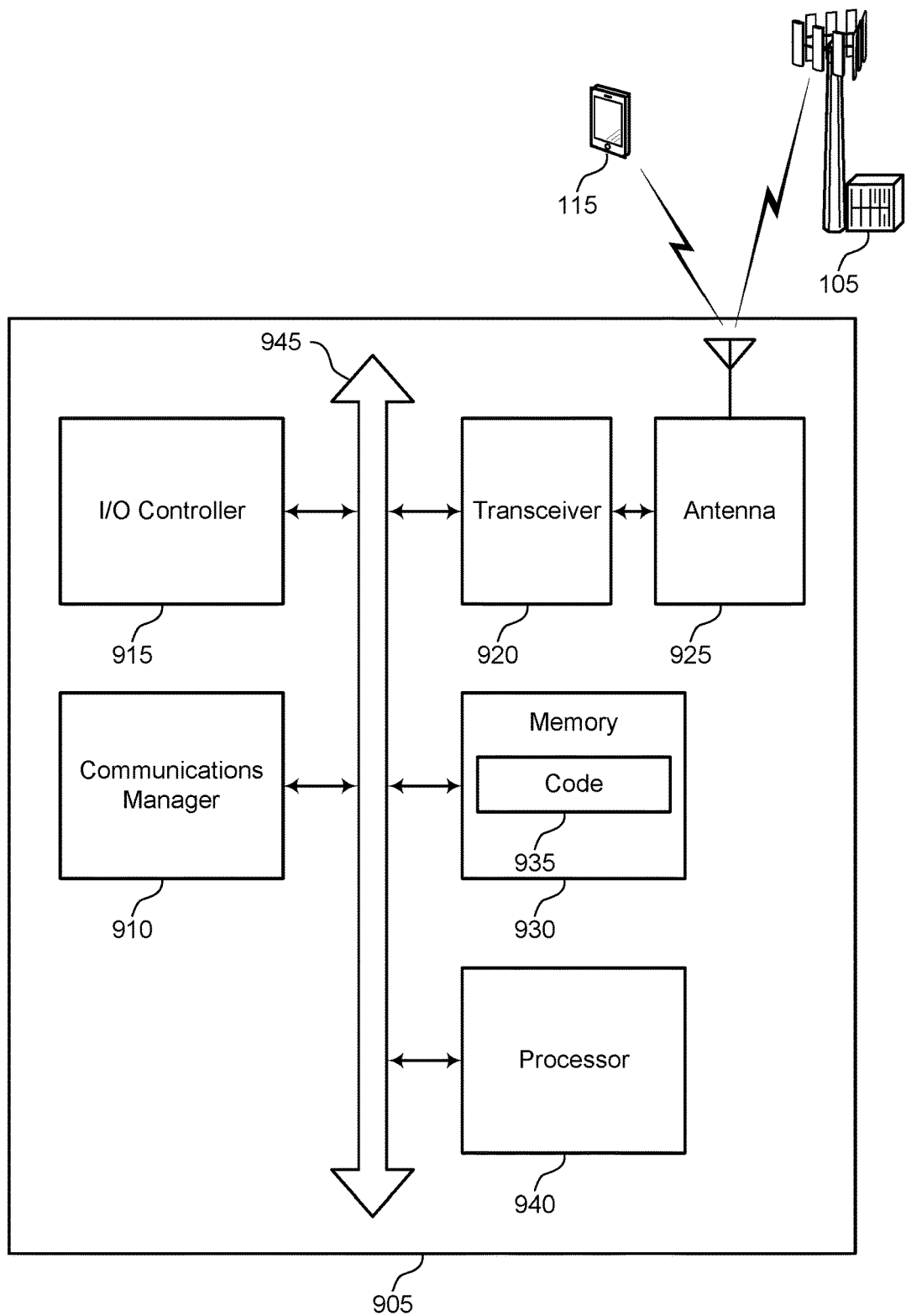
FIG. 9 shows a diagram of a system including a device that supports multicast feedback and retransmission for transport block grouping in accordance with aspects of the present disclosure.

FIG. 9 shows a diagram of a system 900 including a device 905 that supports multicast feedback and retransmission for transport block grouping in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (for example, bus 945).

The communications manager 910 may monitor for a set of transport blocks from a base station, fail to decode one or more transport blocks of the set of transport blocks, transmit one or more negative acknowledgments to the base station indicating that the UE failed to decode the one or more transport blocks, and receive one or more outer-coded transport blocks each including one or more combinations of transport blocks of the set of transport blocks based on transmitting the one or more negative acknowledgments.

The I/O controller 915 may manage input and output signals for the device 905. The I/O controller 915 may also manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In other examples, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some examples, the memory 930 may contain, among other things, a basic I/O system (BIOS) which may control basic hardware or software operation such as the interaction with peripheral components or devices.

The processor 940 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 940 may be configured to operate a memory array using a memory controller. In other examples, a memory controller may be integrated into the processor 940. The processor 940 may be configured to execute computer-readable instructions stored in a memory (for example, the memory 930) to cause the device 905 to perform various functions (for example, functions or tasks supporting multicast feedback and retransmission for transport block grouping).

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (for example, when compiled and executed) to perform functions described herein.

Figure 10:
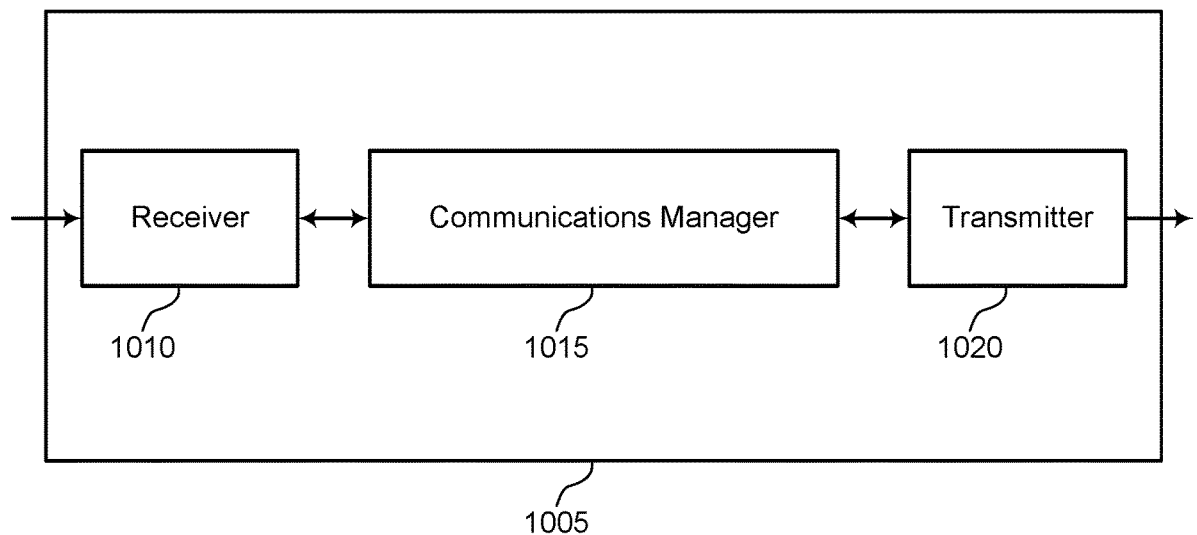
FIGS. 10 and 11 show block diagrams of devices that support multicast feedback and retransmission for transport block grouping in accordance with aspects of the present disclosure.

FIG. 10 shows a block diagram 1000 of a device 1005 that supports multicast feedback and retransmission for transport block grouping in accordance with aspects of the present disclosure. The device 1005 may be an example of aspects of a base station 105 as described herein. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to multicast feedback and retransmission for transport block grouping). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may multicast a set of transport blocks to one or more UEs, detect negative acknowledgment feedback on one or more shared negative acknowledgment resources, the negative acknowledgement feedback indicating that one or more of the one or more UEs failed to decode one or more transport blocks of the set of transport blocks, and multicast one or more outer-coded transport blocks each including a combination of transport blocks of the set of transport blocks based on detecting the negative acknowledgment feedback.

The transmitter 1020 may transmit signals generated by other components of the device 1005. In some examples, the transmitter 1020 may be collocated with a receiver 1010 in a transceiver components. For example, the transmitter 1020 may be an example of aspects of the transceiver 1320 described with reference to FIG. 13. The transmitter 1020 may utilize a single antenna or a set of antennas.

Figure 11:
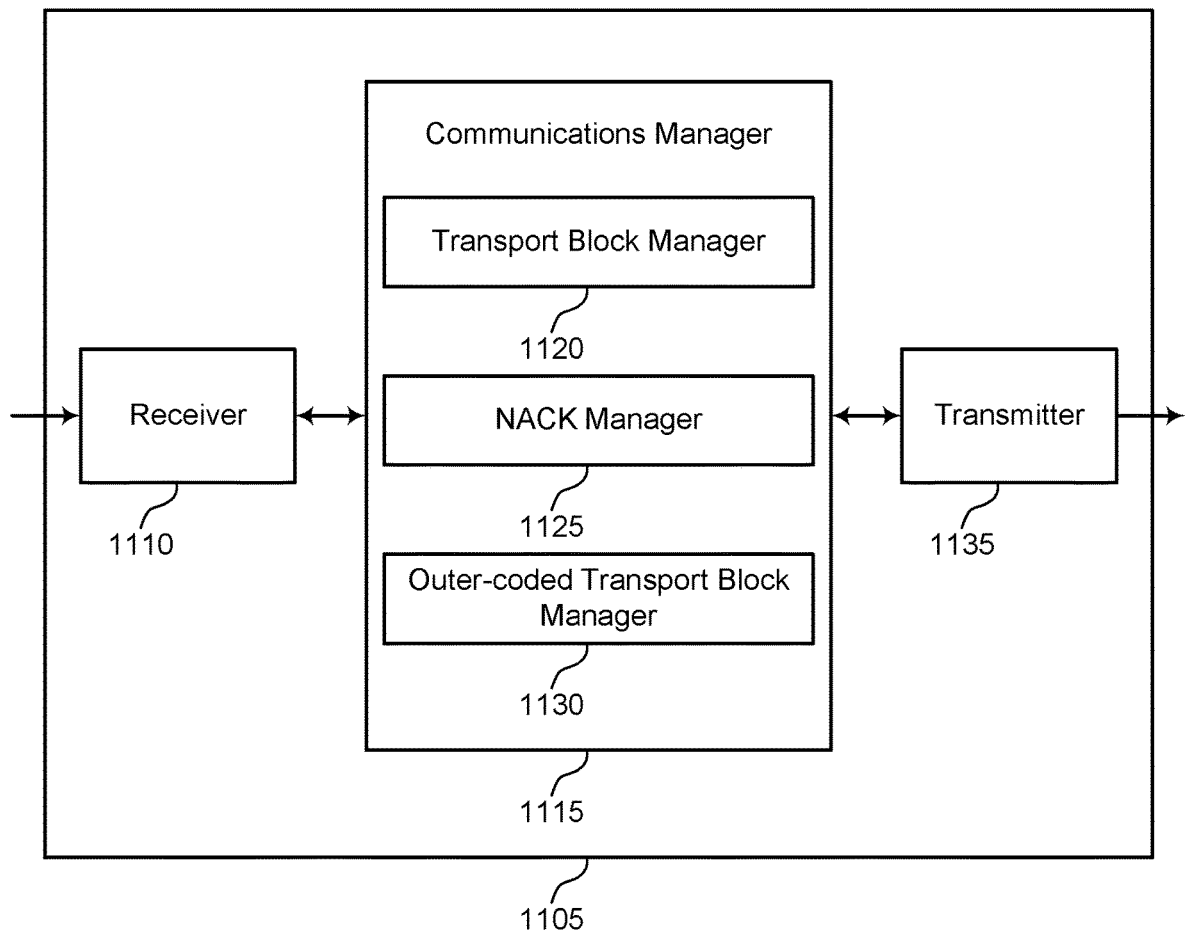

FIG. 11 shows a block diagram 1100 of a device 1105 that supports multicast feedback and retransmission for transport block grouping in accordance with aspects of the present disclosure. The device 1105 may be an example of aspects of a device 1005, or a base station 105 as described herein. The device 1105 may include a receiver 1110, a communications manager 1115, and a transmitter 1135. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to multicast feedback and retransmission for transport block grouping). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may include a transport block manager 1120, a NACK manager 1125, and an outer-coded transport block manager 1130.

The transport block manager 1120 may multicast a set of transport blocks to one or more UEs. The NACK manager 1125 may detect negative acknowledgment feedback on one or more shared negative acknowledgment resources, the negative acknowledgement feedback indicating that one or more of the one or more UEs failed to decode one or more transport blocks of the set of transport blocks. The outer-coded transport block manager 1130 may multicast one or more outer-coded transport blocks each including a combination of transport blocks of the set of transport blocks based on detecting the negative acknowledgment feedback.

The transmitter 1135 may transmit signals generated by other components of the device 1105. In some examples, the transmitter 1135 may be collocated with a receiver 1110 in a transceiver component. For example, the transmitter 1135 may be an example of aspects of the transceiver 1320 described with reference to FIG. 13. The transmitter 1135 may utilize a single antenna or a set of antennas.

Figure 12:
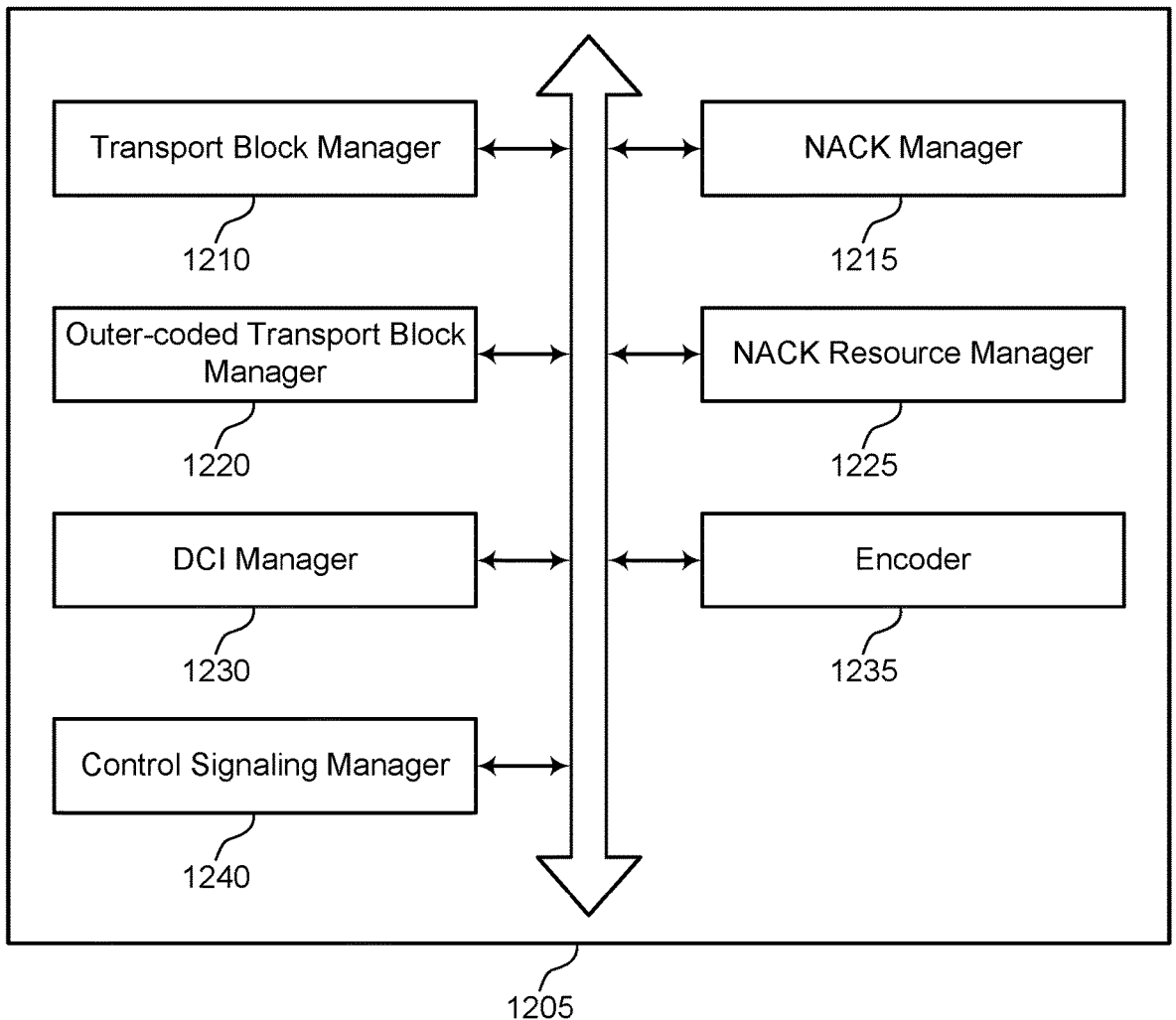
FIG. 12 shows a block diagram of a communications manager that supports multicast feedback and retransmission for transport block grouping in accordance with aspects of the present disclosure.

FIG. 12 shows a block diagram 1200 of a communications manager 1205 that supports multicast feedback and retransmission for transport block grouping in accordance with aspects of the present disclosure. The communications manager 1205 may be an example of aspects of a communications manager 1015, a communications manager 1115, or a communications manager 1310 described herein. The communications manager 1205 may include a transport block manager 1210, a NACK manager 1215, an outer-coded transport block manager 1220, a NACK resource manager 1225, a DCI manager 1230, an encoder 1235, and a control signaling manager 1240. Each of these components may communicate, directly or indirectly, with one another (for example, via one or more buses).

The transport block manager 1210 may multicast a set of transport blocks to one or more UEs. The NACK manager 1215 may detect negative acknowledgment feedback on one or more shared negative acknowledgment resources, the negative acknowledgement feedback indicating that one or more of the one or more UEs failed to decode one or more transport blocks of the set of transport blocks. The outer-coded transport block manager 1220 may multicast one or more outer-coded transport blocks each including a combination of transport blocks of the set of transport blocks based on detecting the negative acknowledgment feedback.

In some examples, the NACK manager 1215 may detect negative acknowledgment feedback on a shared negative acknowledgment resource corresponding to a quantity of the set of transport blocks that the one or more of the one or more UEs failed to decode. In such examples, the outer-coded transport block manager 1220 may multicast a quantity of outer-coded transport blocks based at least in part on the detecting. In some examples, the quantity of outer-coded transport blocks multicast by the base station is equal to a quantity of the set of transport blocks that one or more UEs failed to decode or a maximum quantity of the outer-coded transport blocks.

The NACK resource manager 1225 may transmit one or more indications of negative acknowledgment resources allocated for the one or more UEs to transmit negative acknowledgments to the base station, where each negative acknowledgment resource corresponds to a different quantity of transport blocks that one or more UEs failed to decode, where detecting negative acknowledgment feedback is based on transmitting the one or more indications of negative acknowledgment resources. In some examples, one or more of the negative acknowledgment resources indicate that a quantity of transport blocks that one or more UEs failed to decode is above a maximum quantity of outer-coded transport blocks, and where one or more of the negative acknowledgment resources indicate the quantity of transport blocks that one or more UEs failed to decode.

In some examples, the NACK manager 1215 may iteratively receive negative acknowledgment feedback on one or more shared negative acknowledgment resources and multicasting one or more outer-coded transport blocks until each transport block in the set of transport blocks is successfully decoded by the one or more UEs or until a maximum quantity of outer-coded transport blocks are multicast. In some examples, the NACK manager 1215 may detect negative acknowledgment feedback on a first negative acknowledgment resource indicating that one or more UEs failed to decode one or more of the set of transport blocks. In some examples, the outer-coded transport block manager 1220 may transmit a first outer-coded transport block including a first combination of transport blocks of the set of transport blocks. In some examples, the NACK manager 1215 may detect negative acknowledgment feedback on a second negative acknowledgment resource indicating that one or more UEs failed to decode one or more of the set of transport blocks. In some examples, the outer-coded transport block manager 1220 may transmit a second outer-coded transport block including a second combination of transport blocks of the set of transport blocks.

In some examples, the outer-coded transport block manager 1220 may multicast at least a subset of the one or more outer-coded transport blocks in a single multicast transmission, and the DCI manager 1230 may multicast downlink control information in the single multicast transmission indicating the at least the subset of outer-coded transport blocks included in the single multicast transmission. In some examples, the outer-coded transport block manager 1220 may multicast each of the one or more outer-coded transport blocks in a respective multicast transmission, and the DCI manager 1230 may multicast downlink control information in each respective multicast transmission indicating an outer-coded transport block included in the respective multicast transmission.

In some examples, each of the one or more outer-coded transport blocks includes a different combination of transport blocks of the set of transport blocks. In some examples, the combination of transport blocks of the set of transport blocks includes a linear combination. The encoder 1235 may apply a weight to each transport block in the combination of transport blocks in each outer-coded transport block, where the weight applied by the base station to each transport block in the combination of transport blocks in each outer-coded transport block is preconfigured at the base station. In some examples, the encoder 1235 may apply a weight to each transport block in the combination of transport blocks in each outer-coded transport block. In some examples, the encoder 1235 may transmit control signaling indicating the weight applied by the base station to each transport block in the combination of transport blocks in each outer-coded transport block. The control signaling manager 1240 may transmit control signaling indicating a quantity of the set of transport blocks for which the one or more UEs are to monitor and indicating one or more negative acknowledgment resources allocated for the one or more UEs to transmit the one or more negative acknowledgments.

Figure 13:
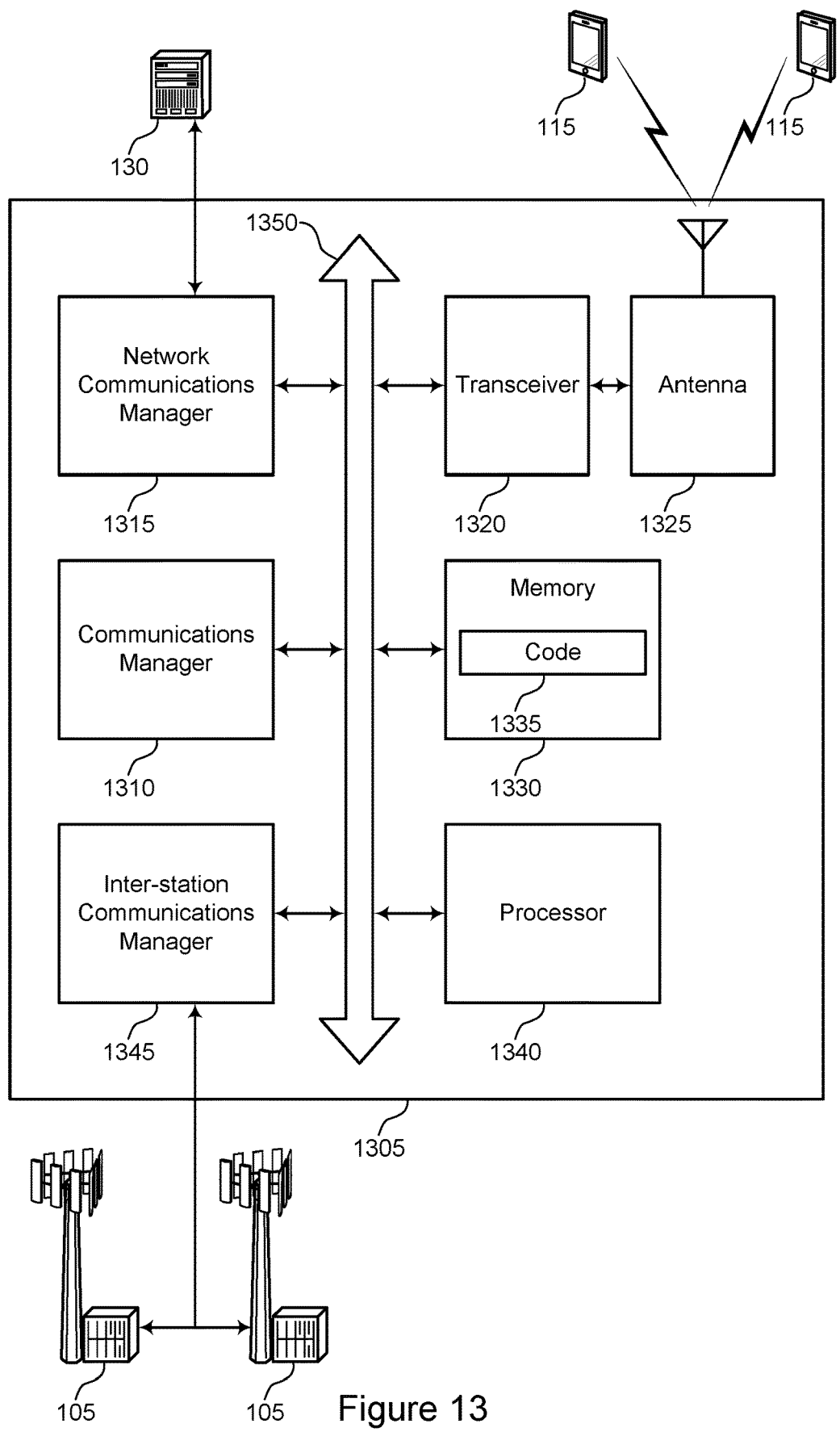
FIG. 13 shows a diagram of a system including a device that supports multicast feedback and retransmission for transport block grouping in accordance with aspects of the present disclosure.

FIG. 13 shows a diagram of a system 1300 including a device 1305 that supports multicast feedback and retransmission for transport block grouping in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (for example, bus 1350).

The communications manager 1310 may multicast a set of transport blocks to one or more UEs, detect negative acknowledgment feedback on one or more shared negative acknowledgment resources, the negative acknowledgement feedback indicating that one or more of the one or more UEs failed to decode one or more transport blocks of the set of transport blocks, and multicast one or more outer-coded transport blocks each including a combination of transport blocks of the set of transport blocks based on detecting the negative acknowledgment feedback.

The network communications manager 1315 may manage communications with the core network (for example, via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (for example, the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some examples, a memory controller may be integrated into processor 1340. The processor 1340 may be configured to execute computer-readable instructions stored in a memory (for example, the memory 1330) to cause the device 1305 to perform various functions (for example, functions or tasks supporting multicast feedback and retransmission for transport block grouping).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (for example, when compiled and executed) to perform functions described herein.

Figure 14:
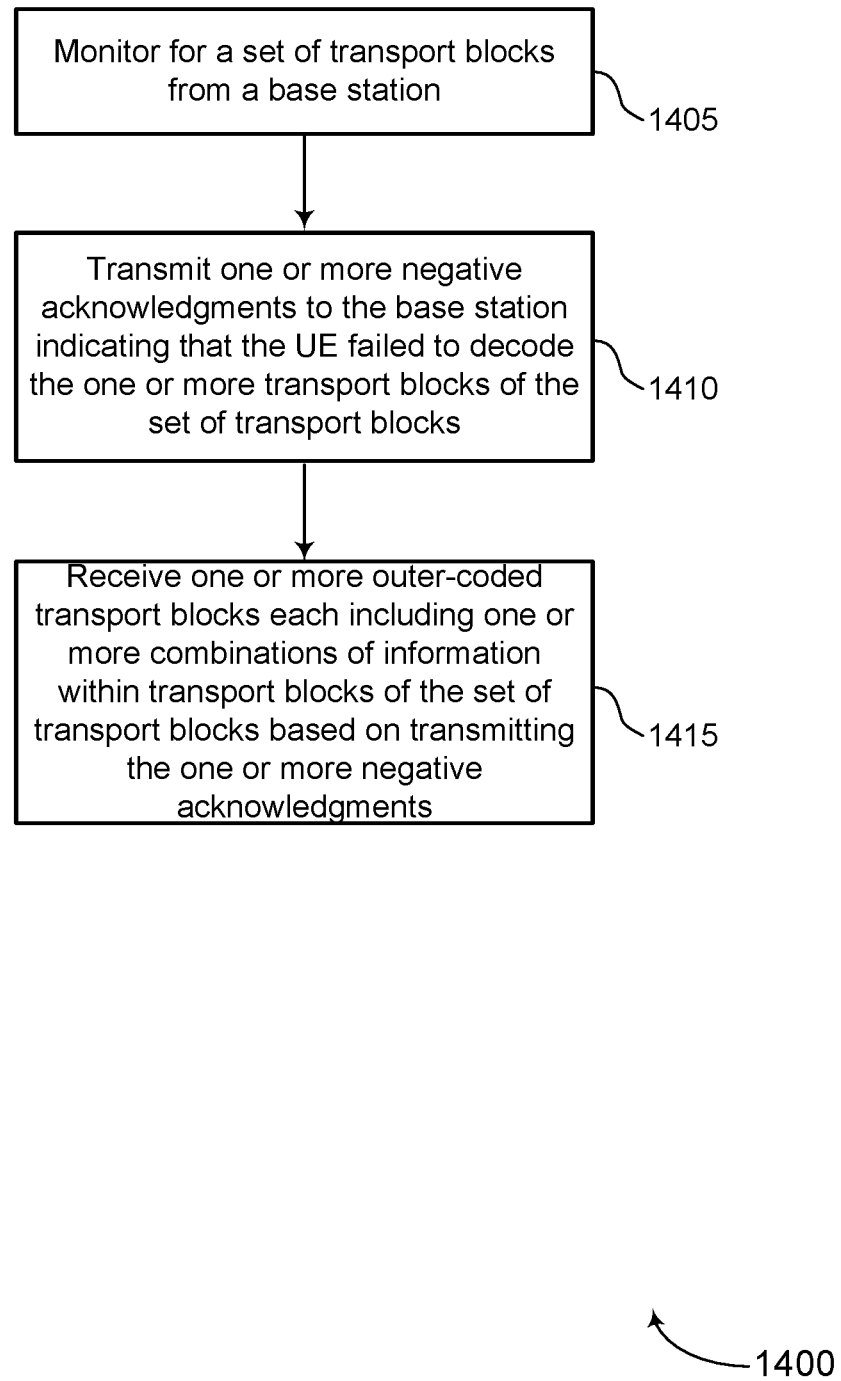
FIGS. 14 and 15 show flowcharts illustrating methods that support multicast feedback and retransmission for transport block grouping in accordance with aspects of the present disclosure.

FIG. 14 shows a flowchart illustrating a method 1400 that supports multicast feedback and retransmission for transport block grouping in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may monitor for a set of transport blocks from a base station. The operations of 1405 may be performed according to the methods described herein. In some examples, aspects of the operations of 1405 may be performed by a transport block manager as described with reference to FIGS. 6-9.

At 1410, the UE may transmit one or more negative acknowledgments to the base station indicating that the UE failed to decode the one or more transport blocks of the set of transport blocks. The operations of 1410 may be performed according to the methods described herein. In some examples, aspects of the operations of 1410 may be performed by a NACK manager as described with reference to FIGS. 6-9.

At 1415, the UE may receive one or more outer-coded transport blocks each including one or more combinations of information within transport blocks of the set of transport blocks based on transmitting the one or more negative acknowledgments. The operations of 1415 may be performed according to the methods described herein. In some examples, aspects of the operations of 1415 may be performed by an outer-coded transport block manager as described with reference to FIGS. 6-9.

Figure 15:
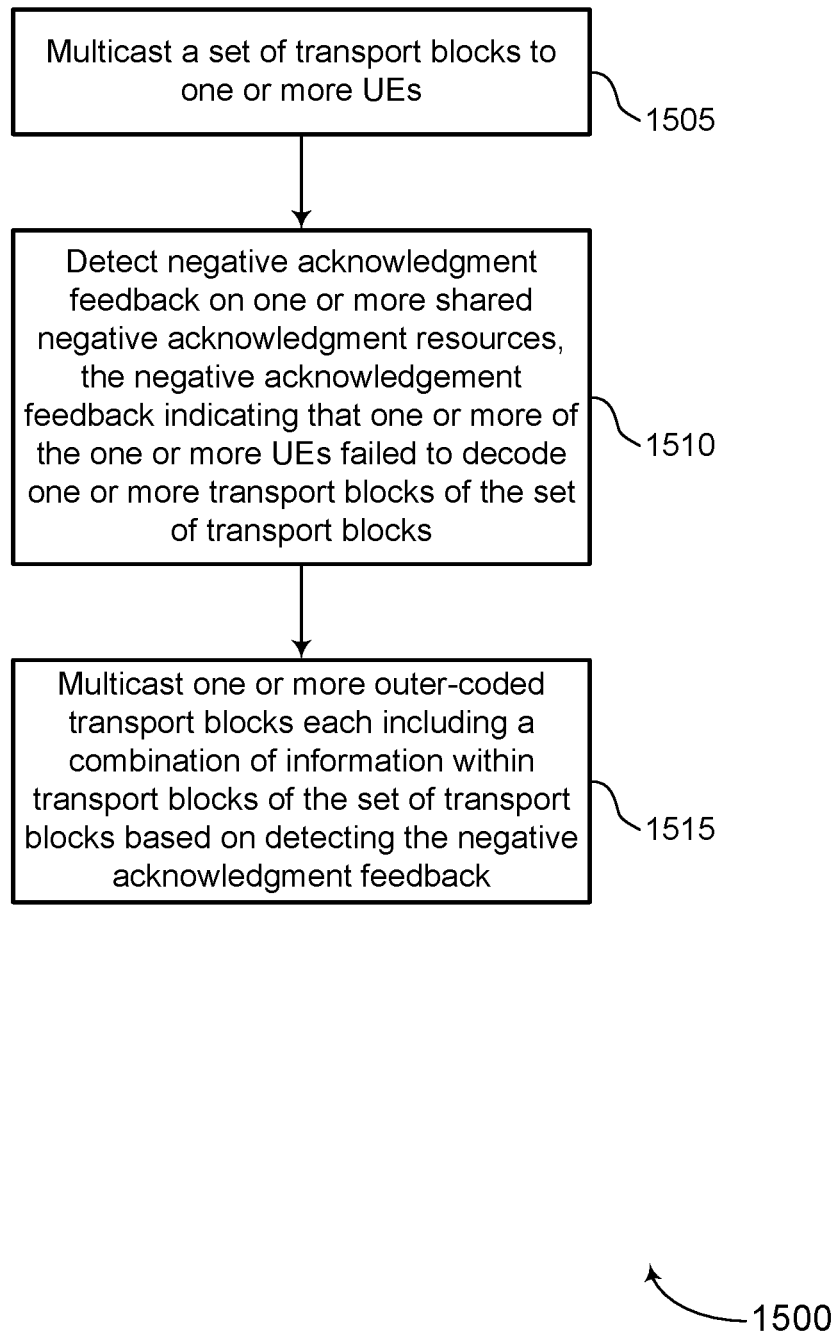

FIG. 15 shows a flowchart illustrating a method 1500 that supports multicast feedback and retransmission for transport block grouping in accordance with aspects of the present disclosure. The operations of method 1500 may be implemented by a base station 105 or its components as described herein. For example, the operations of method 1500 may be performed by a communications manager as described with reference to FIGS. 10-13. In some examples, a base station may execute a set of instructions to control the functional elements of the base station to perform the functions described below. Additionally, or alternatively, a base station may perform aspects of the functions described below using special-purpose hardware.

At 1505, the base station may multicast a set of transport blocks to one or more UEs. The operations of 1505 may be performed according to the methods described herein. In some examples, aspects of the operations of 1505 may be performed by a transport block manager as described with reference to FIGS. 10-13.

At 1510, the base station may detect negative acknowledgment feedback on one or more shared negative acknowledgment resources, the negative acknowledgement feedback indicating that one or more of the one or more UEs failed to decode one or more transport blocks of the set of transport blocks. The operations of 1510 may be performed according to the methods described herein. In some examples, aspects of the operations of 1510 may be performed by a NACK manager as described with reference to FIGS. 10-13.

At 1515, the base station may multicast one or more outer-coded transport blocks each including a combination of information within transport blocks of the set of transport blocks based on detecting the negative acknowledgment feedback. The operations of 1515 may be performed according to the methods described herein. In some examples, aspects of the operations of 1515 may be performed by an outer-coded transport block manager as described with reference to FIGS. 10-13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: monitoring for a set of transport blocks from a base station; failing to decode one or more transport blocks of the set of transport blocks; transmitting one or more negative acknowledgments to the base station indicating that the UE failed to decode the one or more transport blocks; and receiving one or more outer-coded transport blocks each comprising one or more combinations of transport blocks of the set of transport blocks based at least in part on transmitting the one or more negative acknowledgments.

Aspect 2: The method of aspect 1, further comprising: determining a quantity of the one or more transport blocks that the UE failed to decode, wherein transmitting the one or more negative acknowledgments comprises: determining one or more negative acknowledgment resources corresponding to the quantity of the one or more transport blocks that the UE failed to decode; and transmitting the one or more negative acknowledgments to the base station on the one or more negative acknowledgment resources.

Aspect 3: The method of aspect 2, wherein receiving the one or more outer-coded transport blocks comprises receiving a quantity of outer-coded transport blocks equal to the quantity of the one or more transport blocks that the UE failed to decode or a maximum quantity of the outer-coded transport blocks.

Aspect 4: The method of any of aspects 2 through 3, further comprising receiving one or more indications of negative acknowledgment resources allocated for transmitting negative acknowledgments to the base station, wherein each negative acknowledgment resource corresponds to a different quantity of transport blocks that the UE failed to decode, and transmitting the one or more negative acknowledgments is based at least in part on receiving the one or more indications of negative acknowledgment resources.

Aspect 5: The method of aspect 4, wherein one or more of the negative acknowledgment resources indicate that a quantity of transport blocks that the UE failed to decode is above a maximum quantity of the outer-coded transport blocks, and one or more of the negative acknowledgment resources indicate the quantity of transport blocks that the UE failed to decode.

Aspect 6: The method of any of aspects 1 through 5, wherein transmitting the one or more negative acknowledgments and receiving the one or more outer-coded transport blocks comprises iteratively transmitting one or more negative acknowledgments and receiving one or more outer-coded transport blocks until each of the one or more transport blocks that the UE failed to decode is successfully decoded or until a maximum quantity of outer-coded transport blocks are received.

Aspect 7: The method of aspect 6, wherein iteratively transmitting the one or more negative acknowledgments and receiving the one or more outer-coded transport blocks comprises: transmitting a first negative acknowledgment to the base station indicating that the UE failed to decode one or more of the set of transport blocks; receiving a first outer-coded transport block comprising a first combination of the set of transport blocks; failing to decode one or more of the set of transport blocks from the first outer-coded transport block; transmitting a second negative acknowledgment to the base station indicating that the UE failed to decode one or more of the set of transport blocks based at least in part on failing to decode the one or more of the set of transport blocks from the first outer-coded transport block; and receiving a second outer-coded transport block comprising a second combination of the set of transport blocks.

Aspect 8: The method of any of aspects 1 through 7, wherein receiving the one or more outer-coded transport blocks comprises: receiving at least a subset of the one or more outer-coded transport blocks in a single multicast transmission, the method further comprising: receiving downlink control information in the single multicast transmission indicating the at least the subset of outer-coded transport blocks included in the single multicast transmission.

Aspect 9: The method of any of aspects 1 through 8, wherein receiving one or more outer-coded transport blocks comprises: receiving each of the one or more outer-coded transport blocks in a respective multicast transmission, the method further comprising: receiving downlink control information in each respective multicast transmission indicating an outer-coded transport block included in the respective multicast transmission.

Aspect 10: The method of any of aspects 1 through 9, further comprising: determining a coding scheme used to encode the one or more outer-coded transport blocks; and applying one or more successfully decoded transport blocks of the set of transport blocks to the one or more outer-coded transport blocks to decode the one or more transport blocks that the UE failed to decode based at least in part on determining the coding scheme.

Aspect 11: The method of aspect 10, wherein the coding scheme comprises a Reed Solomon coding scheme.

Aspect 12: The method of any of aspects 1 through 11, wherein each of the one or more outer-coded transport blocks comprises a different combination of transport blocks of the set of transport blocks.

Aspect 13: The method of aspect 12, wherein the combination of the transport blocks of the set of transport blocks comprises a linear combination.

Aspect 14: The method of any of aspects 12 through 13, further comprising: determining a weight applied by the base station to each transport block in the combination of transport blocks in each outer-coded transport block, wherein the weight applied by the base station to each transport block in the combination of transport blocks in each outer-coded transport block is preconfigured at the UE; and decoding each outer-coded transport block based at least in part on the determining.

Aspect 15: The method of any of aspects 12 through 14, further comprising: receiving control signaling indicating a weight applied by the base station to each transport block in the combination of transport blocks in each outer-coded transport blocks; and decoding each outer-coded transport block based at least in part on the receiving.

Aspect 16: The method of any of aspects 1 through 15, further comprising receiving control signaling indicating a quantity of the set of transport blocks for which the UE is to monitor and indicating one or more negative acknowledgment resources allocated for transmitting the one or more negative acknowledgments.

Aspect 17: An apparatus for wireless communication at a UE, comprising a processor; memory coupled with the processor; and instructions stored in the memory and executable by the processor to cause the apparatus to perform a method of any of aspects 1 through 16.

Aspect 18: An apparatus for wireless communication at a UE, comprising at least one means for performing a method of any of aspects 1 through 16.

Aspect 19: A non-transitory computer-readable medium storing code for wireless communication at a UE, the code comprising instructions executable by a processor to perform a method of any of aspects 1 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (such as, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
monitoring for a set of transport blocks from a network device;
transmitting, on a resource of a set of resources, one or more negative acknowledgments to the network device indicating that the UE failed to decode one or more transport blocks of the set of transport blocks, a position of each resource within the set of resources corresponding to a different quantity of transport blocks of the set of transport blocks that the UE failed to decode; and
receiving one or more outer-coded transport blocks each comprising one or more combinations of information within transport blocks of the set of transport blocks based at least in part on transmitting the one or more negative acknowledgments.

2. The method of claim 1, further comprising:
determining a quantity of the one or more transport blocks that the UE failed to decode; and
determining the resource within the set of resources corresponding to the quantity of the one or more transport blocks that the UE failed to decode.

3. The method of claim 2, wherein receiving the one or more outer-coded transport blocks comprises receiving a quantity of outer-coded transport blocks equal to the quantity of the one or more transport blocks that the UE failed to decode or a maximum quantity of the outer-coded transport blocks.

4. The method of claim 2, further comprising receiving one or more indications of the set of resources allocated for transmitting negative acknowledgments to the network device, wherein transmitting the one or more negative acknowledgments is based at least in part on receiving the one or more indications of the set of resources.

5. The method of claim 4, wherein one or more resources of the set of resources indicate that a quantity of transport blocks that the UE failed to decode is above a maximum quantity of outer-coded transport blocks, and wherein one or more resources of the set of resources indicate the quantity of transport blocks that the UE failed to decode.

6. The method of claim 1, wherein transmitting the one or more negative acknowledgments and receiving the one or more outer-coded transport blocks comprises iteratively transmitting one or more negative acknowledgments and receiving one or more outer-coded transport blocks until each of the one or more transport blocks that the UE failed to decode is successfully decoded or until a maximum quantity of outer-coded transport blocks are received.

7. The method of claim 6, wherein iteratively transmitting the one or more negative acknowledgments and receiving the one or more outer-coded transport blocks comprises:
transmitting a first negative acknowledgment to the network device indicating that the UE failed to decode one or more of the set of transport blocks;
receiving a first outer-coded transport block comprising a first combination of information within the transport blocks of the set of transport blocks;
transmitting a second negative acknowledgment to the network device indicating that the UE failed to decode one or more of the set of transport blocks based at least in part on failing to decode the one or more of the set of transport blocks from the first outer-coded transport block; and
receiving a second outer-coded transport block comprising a second combination of information within the transport blocks of the set of transport blocks.

8. The method of claim 1, wherein receiving the one or more outer-coded transport blocks comprises:
receiving at least a subset of the one or more outer-coded transport blocks in a single multicast transmission, the method further comprising:
receiving downlink control information in the single multicast transmission indicating the at least the subset of outer-coded transport blocks included in the single multicast transmission.

9. The method of claim 1, wherein receiving one or more outer-coded transport blocks comprises:
receiving each of the one or more outer-coded transport blocks in a respective multicast transmission, the method further comprising:
receiving downlink control information in each respective multicast transmission indicating an outer-coded transport block included in the respective multicast transmission.

10. The method of claim 1, further comprising:
determining a coding scheme used to encode the one or more outer-coded transport blocks; and
applying one or more successfully decoded transport blocks of the set of transport blocks to the one or more outer-coded transport blocks to decode the one or more transport blocks that the UE failed to decode based at least in part on determining the coding scheme.

11. The method of claim 10, wherein the coding scheme comprises a Reed Solomon coding scheme.

12. The method of claim 1, wherein each of the one or more outer-coded transport blocks comprises a different combination of information within the transport blocks of the set of transport blocks.

13. The method of claim 12, wherein the combination of the information within the transport blocks of the set of transport blocks comprises a linear combination.

14. The method of claim 12, further comprising:
determining a weight applied by the network device to each transport block in the combination of transport blocks in each outer-coded transport block, wherein the weight applied by the network device to the information within each transport block in the combination of information within the transport blocks in each outer-coded transport block is preconfigured at the UE; and
decoding each outer-coded transport block based at least in part on the determining.

15. The method of claim 12, further comprising:
receiving control signaling indicating a weight applied by the network device to the information within each transport block in the combination of information within the transport blocks in each outer-coded transport blocks; and
decoding each outer-coded transport block based at least in part on the receiving.

16. The method of claim 1, further comprising receiving control signaling indicating a quantity of the set of transport blocks for which the UE is to monitor and indicating one or more resources allocated for transmitting the one or more negative acknowledgments.

17. A method for wireless communication at a network device, comprising:
multicasting a set of transport blocks to one or more UEs;
detecting negative acknowledgment feedback on one or more shared resources of a set of shared resources, the negative acknowledgement feedback indicating that one or more of the one or more UEs failed to decode one or more transport blocks of the set of transport blocks, wherein a position of each shared resources within the set of shared resources corresponds to a different quantity of transport blocks of the set of transport blocks that the one or more of the one or more UEs failed to decode; and
multicasting one or more outer-coded transport blocks each comprising a combination of information within transport blocks of the set of transport blocks based at least in part on detecting the negative acknowledgment feedback.

18. The method of claim 17, wherein detecting the negative acknowledgment feedback comprises:
detecting negative acknowledgment feedback on a shared resource of the set of shared resources corresponding to a quantity of the one or more transport blocks of the set of transport blocks that the one or more of the one or more UEs failed to decode, the method further comprising:
multicasting a quantity of outer-coded transport blocks based at least in part on the detecting.

19. The method of claim 18, wherein the quantity of outer-coded transport blocks multicast by the network device is equal to a quantity of the set of transport blocks that one or more UEs failed to decode or a maximum quantity of the outer-coded transport blocks.

20. The method of claim 18, further comprising transmitting one or more indications of the set of shared resources allocated for the one or more UEs to transmit negative acknowledgments to the network device, wherein detecting negative acknowledgment feedback is based at least in part on transmitting the one or more indications of the set of shared resources.

21. The method of claim 20, wherein one or more resources of the set of shared resources indicate that a quantity of transport blocks that one or more UEs failed to decode is above a maximum quantity of outer-coded transport blocks, and wherein one or more resources of the set of shared resources indicate the quantity of transport blocks that one or more UEs failed to decode.

22. The method of claim 17, wherein detecting negative acknowledgment feedback on the one or more shared resources of the set of shared resources and multicasting the one or more outer-coded transport blocks comprises iteratively receiving negative acknowledgment feedback on one or more shared resources of the set of shared resources and multicasting one or more outer-coded transport blocks until each transport block in the set of transport blocks is successfully decoded by the one or more UEs or until a maximum quantity of outer-coded transport blocks are multicast.

23. The method of claim 22, wherein iteratively detecting negative acknowledgment feedback and multicasting the one or more outer-coded transport blocks comprises:
   detecting negative acknowledgment feedback on a first resource of the set of shared resources indicating that one or more UEs failed to decode one or more of the set of transport blocks;
   transmitting a first outer-coded transport block comprising a first combination of information within the transport blocks of the set of transport blocks;
   detecting negative acknowledgment feedback on a second resource of the set of shared resources indicating that one or more UEs failed to decode one or more of the set of transport blocks; and
   transmitting a second outer-coded transport block comprising a second combination of information within the transport blocks of the set of transport blocks.

24. The method of claim 17, wherein multicasting the one or more outer-coded transport blocks comprises:
   multicasting at least a subset of the one or more outer-coded transport blocks in a single multicast transmission, the method further comprising:
   multicasting downlink control information in the single multicast transmission indicating the at least the subset of outer-coded transport blocks included in the single multicast transmission.

25. An apparatus for wireless communication at a user equipment (UE), comprising:
   a processor,
   memory coupled with the processor; and
   instructions stored in the memory and executable by the processor to cause the apparatus to:
   monitor for a set of transport blocks from a network device;
   transmit, on a resource of a set of resources, one or more negative acknowledgments to the network device indicating that the UE failed to decode one or more transport blocks of the set of transport blocks, a position of each resource within the set of resources corresponding to a different quantity of transport blocks of the set of transport blocks that the UE failed to decode; and
   receive one or more outer-coded transport blocks each comprising one or more combinations of information within transport blocks of the set of transport blocks based at least in part on transmitting the one or more negative acknowledgments.

26. The apparatus of claim 25, wherein the instructions are further executable by the processor to cause the apparatus to:
   determine a quantity of the one or more transport blocks that the UE failed to decode; and
   determine the resource within the set of resources corresponding to the quantity of the one or more transport blocks that the UE failed to decode.

27. The apparatus of claim 26, wherein the instructions to receive the one or more outer-coded transport blocks are executable by the processor to cause the apparatus to receive a quantity of outer-coded transport blocks equal to the quantity of the one or more transport blocks that the UE failed to decode or a maximum quantity of the outer-coded transport blocks.

28. An apparatus for wireless communication at a network device, comprising:
   a processor,
   memory coupled with the processor; and
   instructions stored in the memory and executable by the processor to cause the apparatus to:
   multicast a set of transport blocks to one or more UEs;
   detect negative acknowledgment feedback on one or more shared resources of a set of shared resources, the negative acknowledgement feedback indicating that one or more of the one or more UEs failed to decode one or more transport blocks of the set of transport blocks, wherein a position of each shared resources within the set of shared resources corresponds to a different quantity of transport blocks of the set of transport blocks that the one or more of the one or more UEs failed to decode; and
   multicast one or more outer-coded transport blocks each comprising a combination of transport blocks of the set of transport blocks based at least in part on detecting the negative acknowledgment feedback.

29. The apparatus of claim 28, wherein the instructions to detect the negative acknowledgment feedback are executable by the processor to cause the apparatus to:
   detect negative acknowledgment feedback on a shared resource of the set of shared resources, the position of the shared resource within the set of shared resources corresponding to a quantity of the one or more transport blocks of the set of transport blocks that the one or more of the one or more UEs failed to decode, and the instructions are further executable by the processor to cause the apparatus to:
   multicast a quantity of outer-coded transport blocks based at least in part on the detecting.

30. The apparatus of claim 29, wherein the quantity of outer-coded transport blocks multicast by the network device is equal to a quantity of the set of transport blocks that one or more UEs failed to decode or a maximum quantity of the outer-coded transport blocks.

* * * * *